US011167200B2

(12) United States Patent
Treadway et al.

(10) Patent No.: US 11,167,200 B2
(45) Date of Patent: Nov. 9, 2021

(54) BATTERY POWERED SKATEBOARD

(71) Applicant: Acton, Inc., Santa Clara, CA (US)

(72) Inventors: Peter Treadway, Pleasanton, CA (US); Janelle Wang Treadway, Pleasanton, CA (US)

(73) Assignee: Acton, Inc., Santa Clara, CA (US)

( * ) Notice: Subject to any disclaimer, the term of this patent is extended or adjusted under 35 U.S.C. 154(b) by 21 days.

(21) Appl. No.: 15/785,070

(22) Filed: Oct. 16, 2017

(65) Prior Publication Data

US 2018/0104567 A1 Apr. 19, 2018

Related U.S. Application Data

(60) Provisional application No. 62/409,245, filed on Oct. 17, 2016.

(51) Int. Cl.
*A63C 17/00* (2006.01)
*A63C 17/26* (2006.01)
*A63C 17/12* (2006.01)
*A63C 17/01* (2006.01)
*B60K 7/00* (2006.01)

(52) U.S. Cl.
CPC .......... *A63C 17/265* (2013.01); *A63C 17/012* (2013.01); *A63C 17/015* (2013.01); *A63C 17/12* (2013.01); *B60K 7/0007* (2013.01); *A63C 2203/12* (2013.01); *A63C 2203/14* (2013.01); *A63C 2203/22* (2013.01); *B60K 2007/0038* (2013.01); *B60K 2007/0092* (2013.01)

(58) Field of Classification Search
CPC ..... A63C 17/12; A63C 17/01; A63C 17/0006; A63C 17/015; A63C 17/012
See application file for complete search history.

(56) References Cited

U.S. PATENT DOCUMENTS

| | | | | |
|---|---|---|---|---|
| 4,991,066 A | * | 2/1991 | McCowan | A63C 17/26 280/87.042 |
| 4,997,196 A | * | 3/1991 | Wood | A63C 17/01 280/87.042 |
| 6,802,636 B1 | * | 10/2004 | Bailey, Jr. | A63C 17/01 280/841 |
| 7,053,288 B2 | * | 5/2006 | Iwai | A63C 5/06 280/87.042 |
| 7,311,164 B1 | * | 12/2007 | Kertes | B62J 6/015 180/180 |
| 7,712,937 B2 | * | 5/2010 | Grossman | B62K 3/002 362/249.02 |
| 2005/0006158 A1 | * | 1/2005 | Tsai | A63C 17/12 180/167 |
| 2006/0032682 A1 | * | 2/2006 | Hillman | A63C 17/01 180/65.1 |

(Continued)

*Primary Examiner* — Hau V Phan
(74) *Attorney, Agent, or Firm* — Paul Davis

(57) ABSTRACT

The disclosure relates generally to an electric skateboard. The electric skateboard may include a deck, at least a rechargeable battery pack, a control module, and a communications module, a pair of trucks mounted to the deck, a plurality of wheels mounted on axles of the trucks; and one or more motors installed in one or more of the plurality of wheels for propelling the electric skateboard. The deck may include a front end, a rear end, a top plate. The rechargeable battery pack, control module, and communications module may be enclosed in an enclosure attached to the deck.

8 Claims, 29 Drawing Sheets

(56) References Cited

U.S. PATENT DOCUMENTS

| | | | |
|---|---|---|---|
| 2006/0049595 A1* | 3/2006 | Crigler | A63C 17/01 |
| | | | 280/87.042 |
| 2006/0170174 A1* | 8/2006 | Hiramatsu | A63C 17/0033 |
| | | | 280/87.041 |
| 2013/0056942 A1* | 3/2013 | Maratta | A63C 5/035 |
| | | | 280/28.5 |
| 2013/0081891 A1* | 4/2013 | Ulmen | A63C 17/12 |
| | | | 180/181 |
| 2014/0027192 A1* | 1/2014 | King | A63C 17/12 |
| | | | 180/181 |
| 2015/0122566 A1* | 5/2015 | Constien | B62H 1/02 |
| | | | 180/210 |
| 2016/0059108 A1* | 3/2016 | Demolder | A63C 17/12 |
| | | | 701/22 |
| 2016/0256767 A1* | 9/2016 | Cerboneschi | A63C 17/01 |

\* cited by examiner

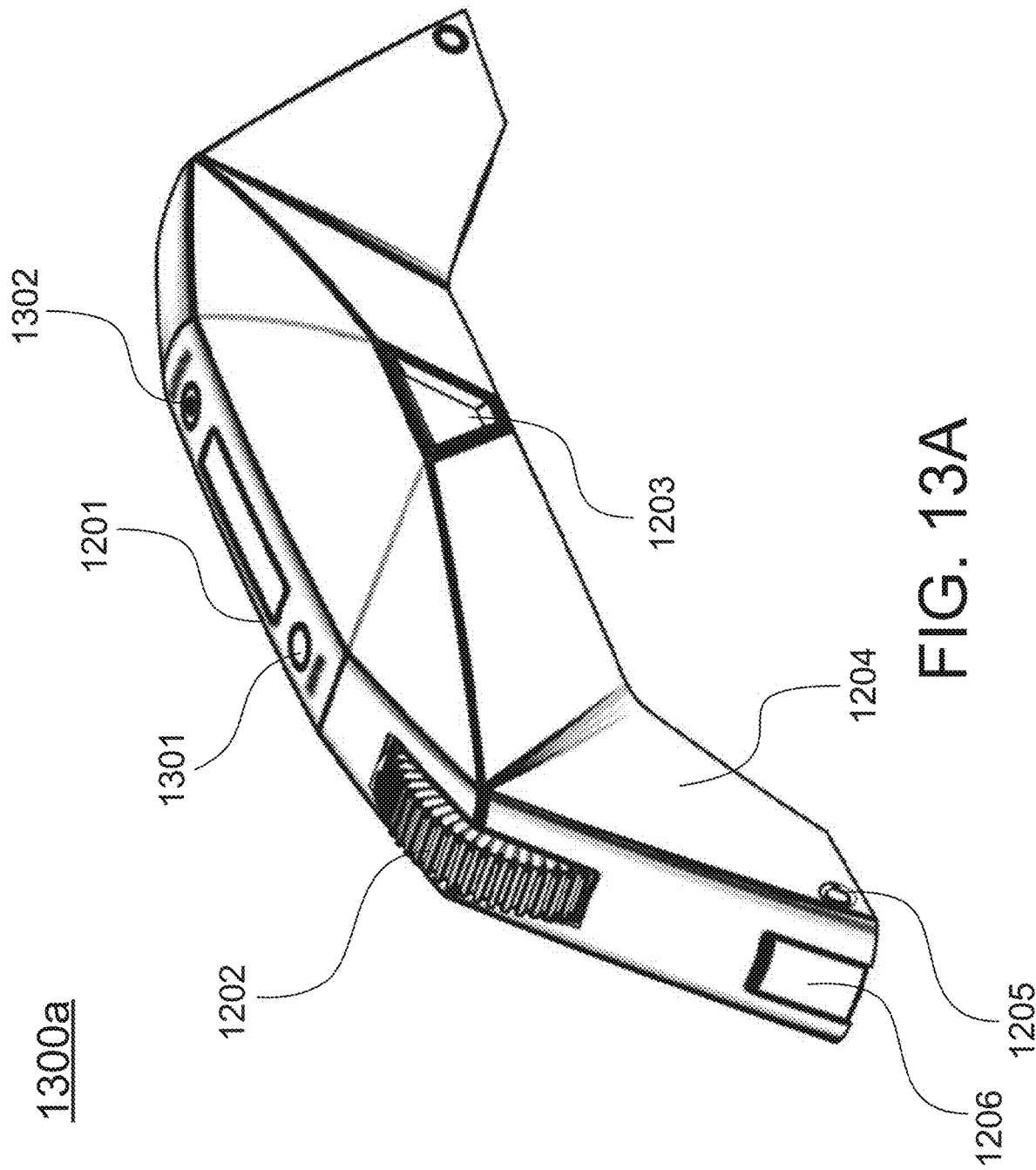

BATTERY POWERED SKATEBOARD

TECHNICAL FIELD

The present disclosure relates generally to skateboards, and in particular, to electric skateboards and similar devices.

BACKGROUND

Skateboarding has been a popular form of recreation over many years. Nonetheless, skateboards have fundamentally changed little since the inception. A variety of skateboards have been created and used, but no one prior to the inventor(s) has created or used the invention as described herein.

BRIEF SUMMARY

According to one embodiment of the present disclosure, an electric skateboard may include a deck including a front end and a rear end, at least a rechargeable battery pack enclosed in an enclosure attached to the deck, a front truck mounted on the front end and a rear truck mounted on rear end of the deck, and a pair of wheels mounted on the front truck and a pair a wheels mounted on the rear truck, each of the two pairs of wheels including a hub motor.

According to another embodiment of the present disclosure, an electric skateboard may include a deck comprising a front end and a rear end, at least a rechargeable battery pack, a control module, and a communications module being enclosed in an enclosure attached to the deck, a pair of trucks mounted to the front end and rear end of the deck, a pair of wheels mounted on each of the pair of trucks, and at least one motor mounted on at least one of the pair of trucks for propelling the wheels mounted on the truck.

According to a further embodiment of the present disclosure, an electric skateboard may include a deck including a front end and a rear end, and the deck having a length between the front end and the rear end, at least a rechargeable battery pack enclosed in an enclosure attached to the deck, a front truck mounted at the front end and a rear truck mounted at the rear end of the deck, a pair of wheels mounted on the front truck and a pair a wheels mounted on the rear truck, at least one motor mounted on one of the front truck and the rear truck to drive the wheels mounted on the truck, and two elongated lights each mounted on a side of the deck, wherein the elongated light is more than half of the length of the deck.

Other objects, features and advantages of the described embodiments will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

Preferred and non-limiting embodiments of the invention may be more readily understood by referring to the accompanying drawings in which:

FIG. 13A shows a perspective view of the remote controller in the folded state;

Figure 1:
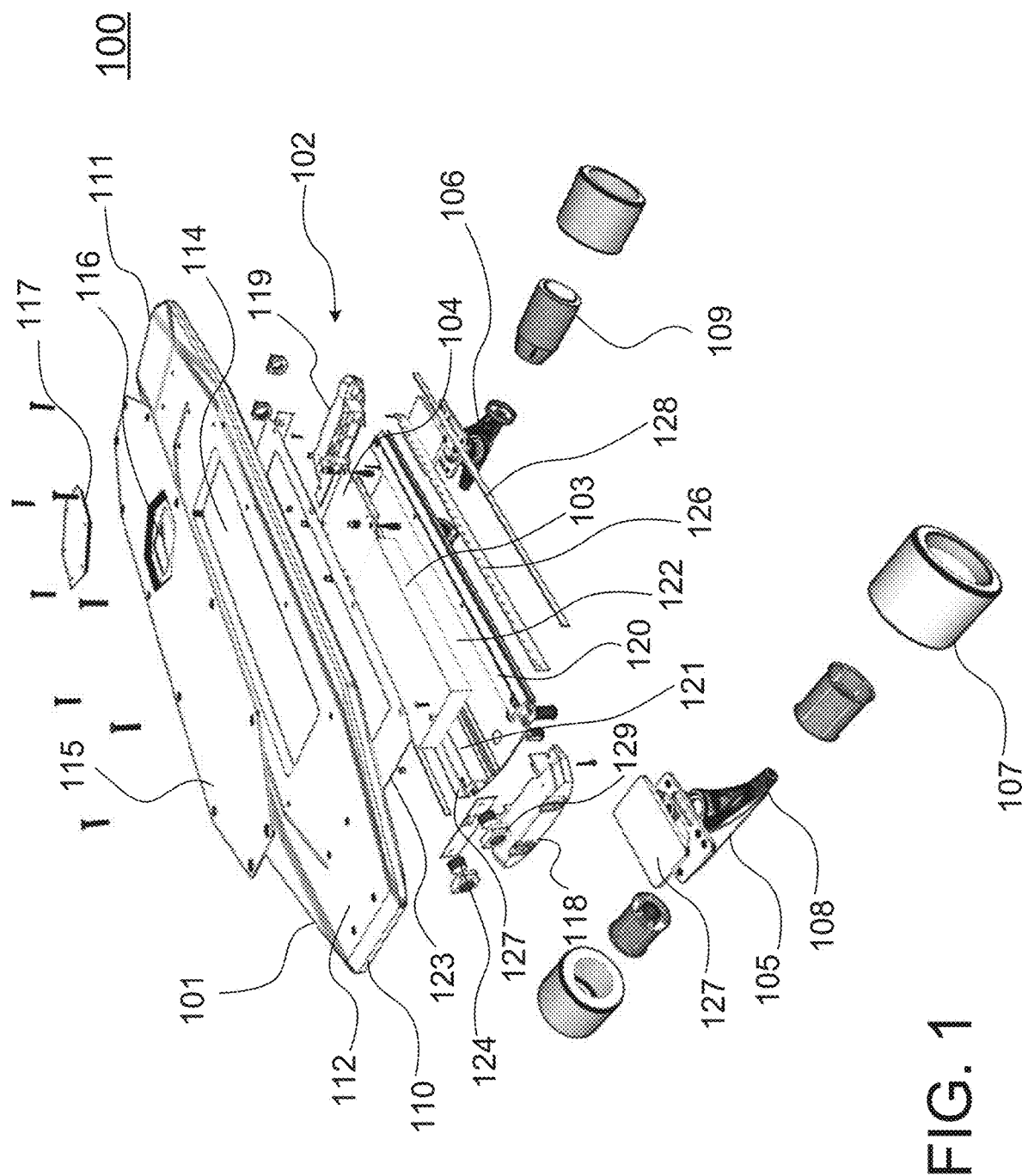
FIG. 1 shows an exploded view of an electric skateboard, according to one exemplary embodiment.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF THE PREFERRED EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of but a small number of embodiments within the scope of the present invention. Various changes and modifications obvious to one skilled in the art to which the present invention pertains are deemed to be within the spirit, scope and contemplation of the present invention as further defined in the appended claims.

Unless the context requires otherwise, throughout the present specification and claims, the word "comprise" and variations thereof, such as, "comprises" and "comprising" are to be construed in an open, inclusive sense, that is as "including, but not limited to". Numeric ranges are also inclusive of the numbers defining the range. Additionally, the singular forms "a", "an", and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

"Optional" or "optionally" means that the subsequently described event of circumstances may or may not occur, and that the description includes instances where said event or circumstance occurs and instances in which it does not. For example, "optional frame piece" means that the frame piece may or may not be included.

Embodiments disclosed herein are directed to electric skateboards. Referring to FIG. 1, for instance, an embodiment disclosed herein is directed to an electric skateboard (100) that has a frame assembly (for example, a deck or plate) (101) with an opening (114) leading into a battery case (102) that is mounted to the bottom of the deck (101). A top plate (115) covers the opening (114) of the deck (101) and forms, together with the battery case (102), an enclosure for housing a rechargeable battery pack (103), a control module (104), communications module, wires, etc. As seen in FIG. 1, the enclosure is attached to a bottom surface of the deck 101. In some embodiments, the enclosure may be attached to a top surface of the deck 101 or placed inside the deck 101. The electric skateboard (100) further includes a pair of trucks (105 and 106) mounted to the bottom of the deck (101) and a plurality of wheels (107) mounted on axles (108) of the trucks (105 and 106). The electric skateboard (100) may further include a plurality of lights for illumination. As demonstrated in FIG. 1, a single motor (109) is installed in one of the wheels (107) for propelling the electric skateboard (100). Alternatively, multiple motors may be installed in multiple wheels. Another exploded view (200) of the electric skateboard (100) is demonstrated in FIG. 2.

In one embodiment, the deck (101) has a front end (110), a rear end (111), a top side (112), and a bottom side (113). The two trucks (105 and 106) are respectively mounted to the front end (110) and rear end (111). The deck (101) may be made of wood or other materials. In one embodiment, the opening (114) is cut out of the middle of the deck (101), leading into the battery case (102) that is mounted to the bottom side (113) of the deck (101). The top plate (115) covers the opening (114) of the deck (101) and seals the enclosure to form a sandwich construction deck. The top plate (115) may be secured to the top side (112) of the deck (101) via screws or other means. In an embodiment, the top plate (115) is made of aluminum, magnesium alloys, or other materials. The opening (114) and the top plate (115) span for a significant portion of the deck (101), according to one embodiment. For example, the opening (114) may span from one set of truck mounting holes to the other set of truck mounting holes. In an embodiment, the opening (114) partially houses the battery pack (103) and/or the electronics.

In an alternative embodiment, the opening (114) is sealed by a flat bottom plate instead of the battery case (102), and the battery pack (103) and the electronics are kept entirely within the opening (114), between the top plate (115) and the flat bottom plate. The thickness of the deck (101) may vary. In an embodiment, the deck (101) is thicker than the battery pack (103) and the electronics, which can then be entirely housed within the opening (114).

In one embodiment, the top plate (115), which may be made of materials that block signals, includes an opening (116) that is covered by a plastic cover (117), allowing wireless signals to pass through. The plastic cover (117) may be located above the communications module that may include wireless transceiver (e.g., an antenna). In an embodiment, the antenna may be mounted to the bottom surface of the plastic cover (117). In an embodiment, the plastic cover (117) may be made of other materials that do not block signals, and may have various shapes. The plastic cover (117) may be secured to the top plate (115) via screws or other means. In an alternative embodiment, the opening (116) and plastic cover (117) are optional, and the top plate (115) may be an integral piece made of carbon fiber or other materials that allow wireless signals to pass through.

In an embodiment, the battery case (102) includes a front end (118) and a rear end (119) that are connected to a bottom piece (122) having two sides (120 and 121), in which the rechargeable battery pack (103) and electronics sit. In an embodiment, the bottom piece (122) with the sides (120 and 121) is a one-piece aluminum extrusion, providing enhanced strength to the overall structure. In one embodiment, the bottom piece (122) includes slots that receive extruded ends of the front end (118) and rear end (119). The sides (120 and 121) may include holes for receiving screws that secure the battery case (102) to the bottom of the deck (101). In an embodiment, the battery case (102) may be mounted to the deck (101) via other fasteners. An optional frame piece (123) is located between the battery case (102) and the deck (101), and has an opening that aligns with the opening (114) in the deck (101). In an embodiment, the disclosed construction of the deck (101) is substantially stronger than a normal wooden deck, since the screws that hold the whole assembly together are spread out along the length of the deck (101) to distribute forces along the extrusion of the battery case (102), which carries the most strength in the assembly.

The rechargeable battery pack (103) powers the electrical components of the electric skateboard (100). Any type of rechargeable batteries may be used. For example, the battery pack (103) may include a plurality of battery cells, e.g., 18650 cells, lined up in a row. In an embodiment, the opening (114) in the deck (101) is big enough to allow the rechargeable battery pack (103) to sit inside it. The electronics of the skateboard may include a control module (104) (e.g., a circuit) that is configured to process signals and generate control signals to control the one or more motors (109). The electronics may also include communications module that includes a signal transceiver (e.g., an antenna, a Bluetooth transceiver, a Wi-Fi transceiver, a radio signal transceiver, etc.) for communicating wirelessly with an external device, such as a remote controller, a mobile phone, etc. In an embodiment, the signal transceiver is located below the plastic cover (117) so that the wireless signals can pass through. In another embodiment, the signal transceiver can be located anywhere in the enclosure if the top plate (115) does not block wireless signals.

In an embodiment, the electric skateboard (100) includes one or more head lights (124), one or more tail lights (125), and/or one or more side lights (126) mounted to the front end (118), rear end (119), and/or two sides (120 and 121), respectively. Alternatively or additionally, one or more lights may be installed in other locations of the electric skateboard (100). In an embodiment, the lights are light-emitting diodes (LED) or other types of lights. Although FIGS. 1 and 2 demonstrate two head lights, one tail light, and two side lights, it should be appreciated that other numbers of lights may be included. In an embodiment, the lights may provide illumination under the deck (101) in some or all directions. Optionally, the top of the deck (101) may be illuminated. In one embodiment, the lights are integral LEDs embedded in the battery case (102). In one embodiment, the two sides (120 and 121) of the battery case (102) may include slots into which the side lights (126) slides through. In one embodiment, the side lights (126) may have an elongated shape. The side lights (126) each may be a continuous elongated light. Alternatively, the side lights (126) each may include multiple light bulbs covered by one continuous cover that makes the side light (126) look like one continuous elongated light. In other embodiments, the lights may be mounted to the skateboard via other means. Each side light may extend approximately to the front and the rear end of the deck (101). The deck (101) has a length between the front end and the rear end, and, in one embodiment, the two elongated side lights each are more than half of the length of the deck. The battery case (102) may include holes through which electric wires connect the lights to the electronics and/or battery pack (103). Optional lenses (128 and 129) may be placed over the top of the LEDs to diffuse the lighting and create a glow. In an embodiment, the head lights and tail lights are super bright LEDs. In an embodiment, the lights may provide forward vision as much as overall visibility to other drivers and people. Some or all of the lights may be optional.

In an embodiment, each of the trucks (105 and 106) includes a baseplate that is mounted to a mounting plate (127) that is secured to the bottom side (113) of the deck (101). Beneath the baseplate is a hanger with an axle (108), to which the wheels (107) are mounted. In an embodiment, the trucks (105 and 106) may include a bolt with a bushing for providing cushion. One truck (105) is located adjacent to the front end (110) of the skateboard while the other truck (106) adjacent to the rear end (111). Trucks and wheels may be a variety that is known in the art. Various types of fasteners or other means of attachment may be used to mount the trucks (105 and 106) to the deck (101). It should be appreciated that the exact number of fasteners, and their corresponding location may be varied according to design, and stress needs.

Figure 2:
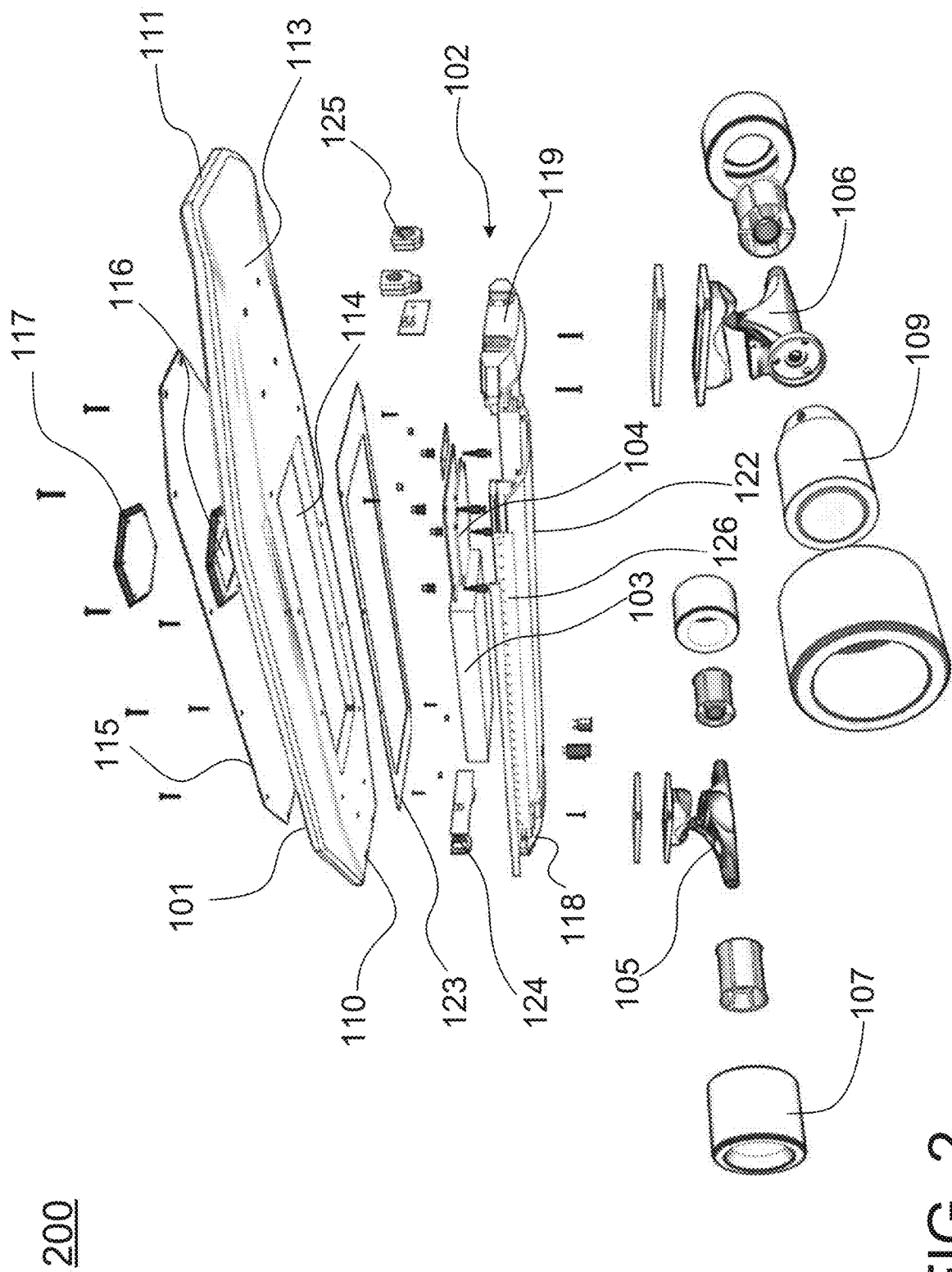
FIG. 2 shows another exploded view of the electric skateboard of FIG. 1.

As demonstrated in FIGS. 1 and 2, the electric skateboard (100) includes a single motor (109) that is installed in a rear wheel. In another embodiment, two rear wheels may be powered by one motor with a differential. For example, the truck (105 or 106) may include a shaft coupled to the two wheels. The motor is coupled to the shaft to turn the two wheels. In alternative embodiments, the electric skateboard (100) may include multiple motors installed in multiple wheels. For instance, two rear motors may be used to power two rear wheels, respectively. In another embodiment, some or all of the wheels may be motorized. In yet another embodiment, each of the wheels (107) may include a hub motor. Electric wires may go through a channel(s) in the truck(s) to connect the motor(s) to the control module (104), which may control the power supply to the motor(s). The motor (109) may be any type of motor that is compatible with the dimension of the wheel (107).

Figure 3A:
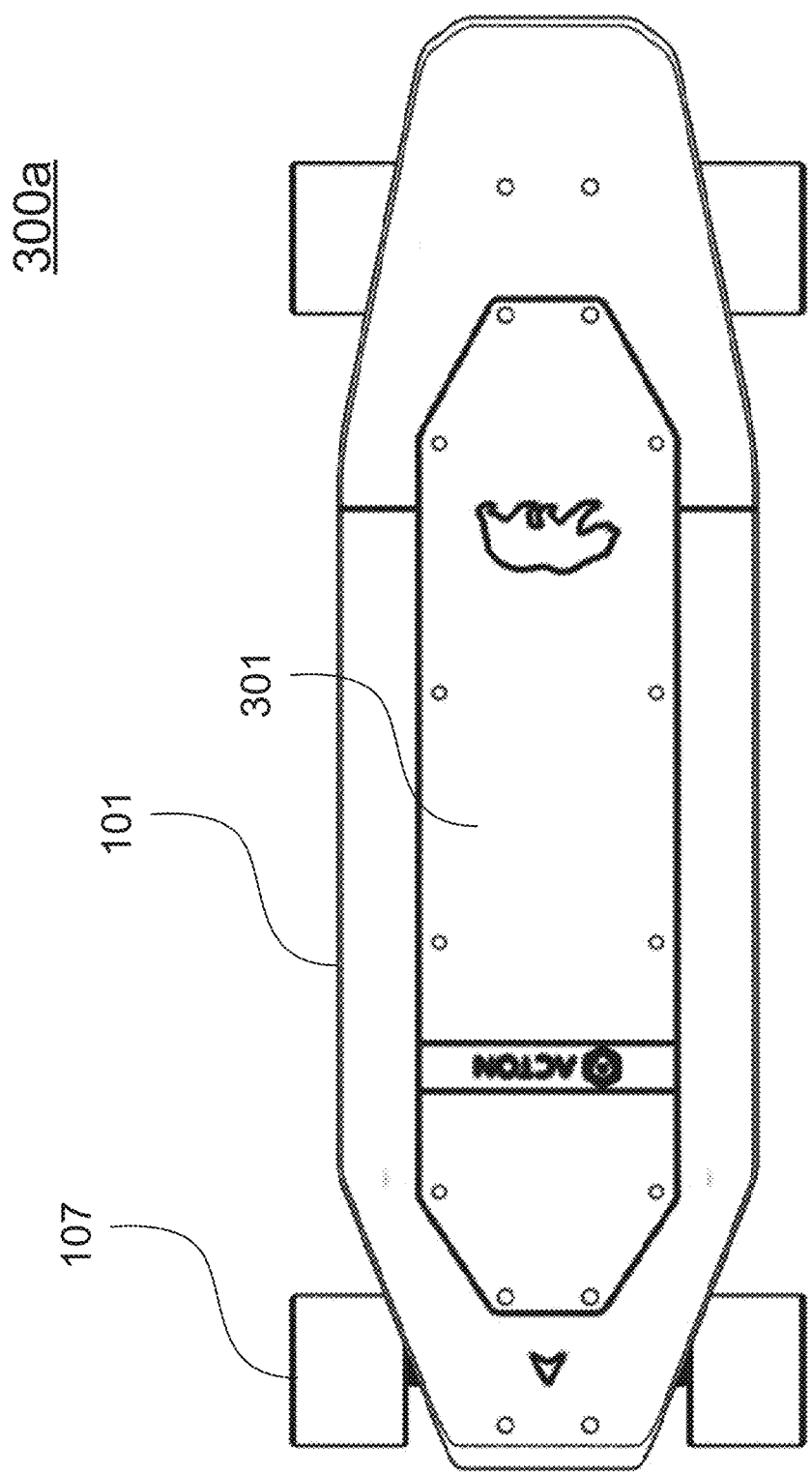
FIG. 3A shows a top view of the electric skateboard of FIG. 1.
Figure 3B:
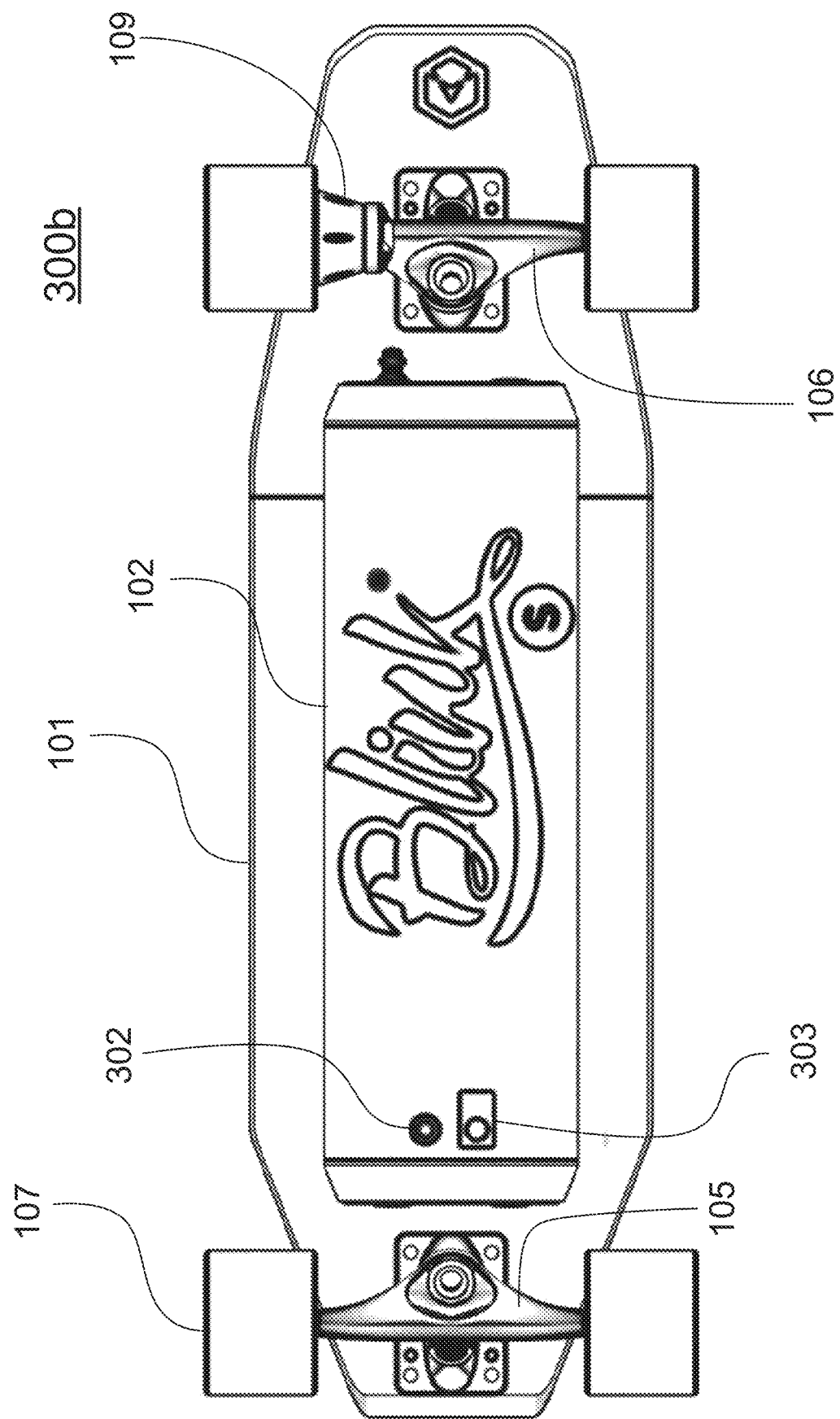
FIG. 3B shows a bottom view of the electric skateboard of FIG. 1.
Figure 4A:
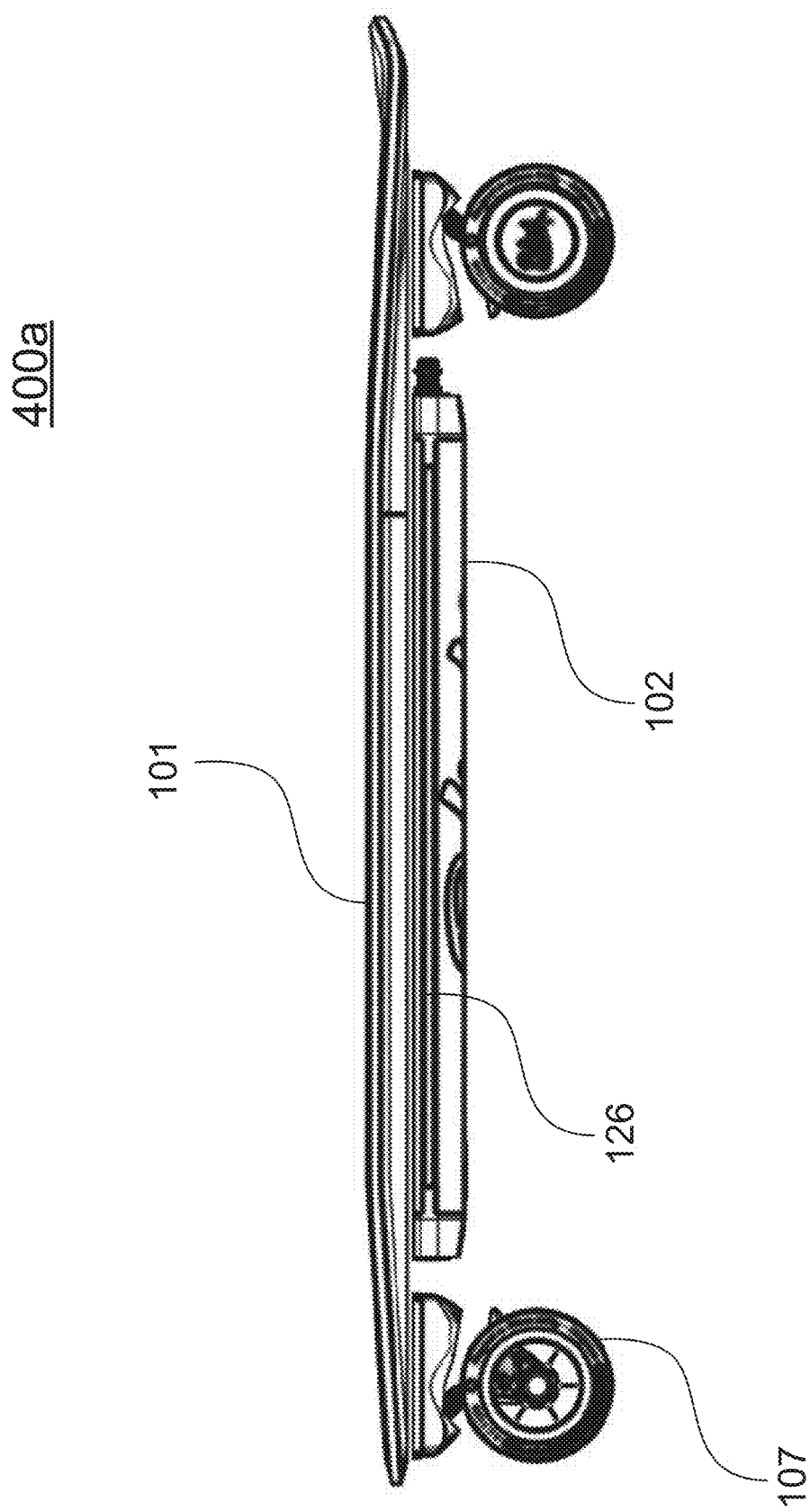
FIGS. 4A and 4B show side views of the electric skateboard of FIG. 1.
Figure 4B:
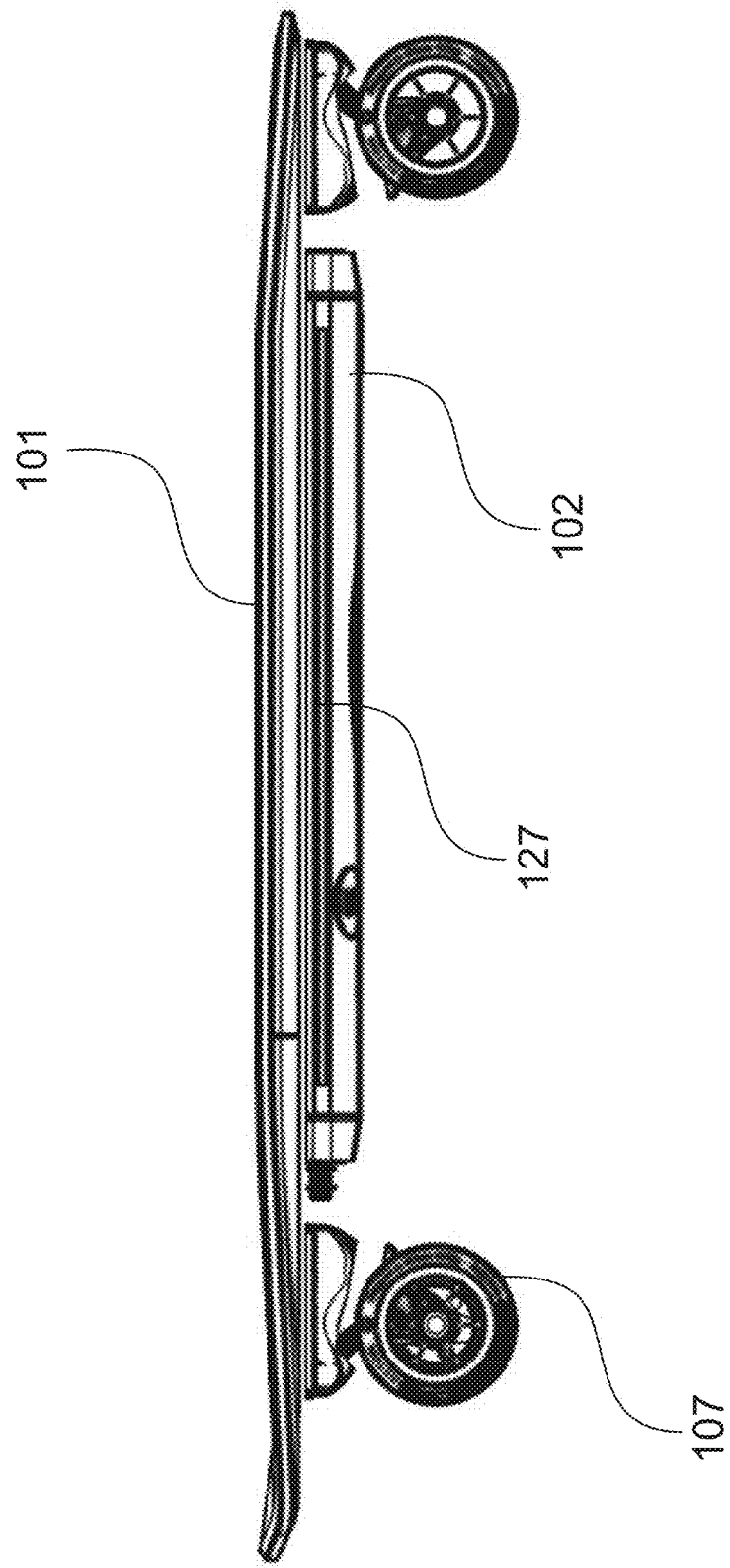
Figure 5B:
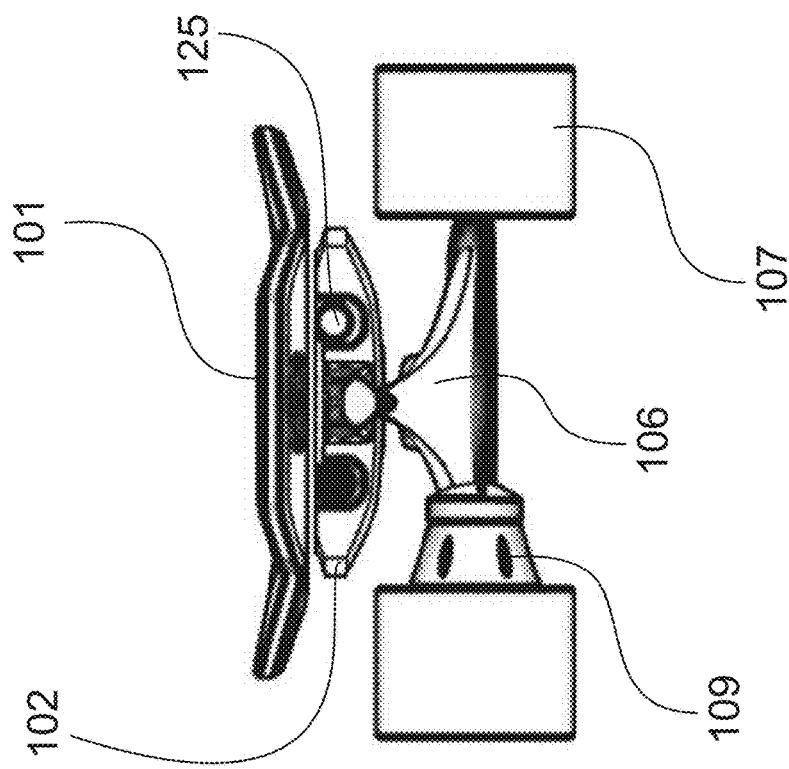
FIG. 5B shows a rear view of the electric skateboard of FIG. 1.
Figure 5A:
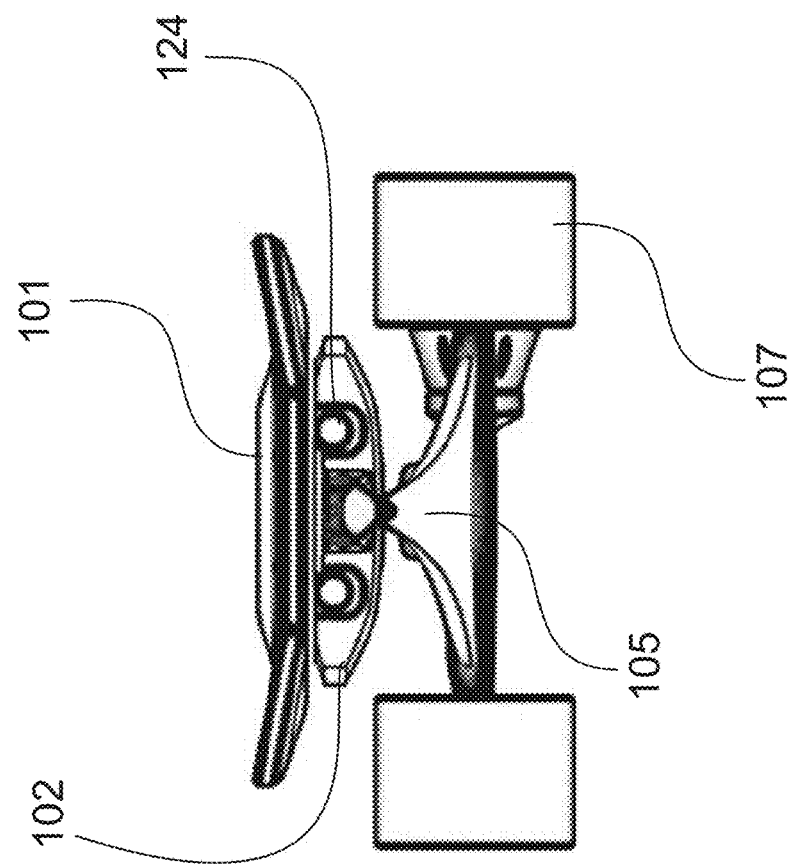
FIG. 5A shows a front view of the electric skateboard of FIG. 1.
Figure 6:
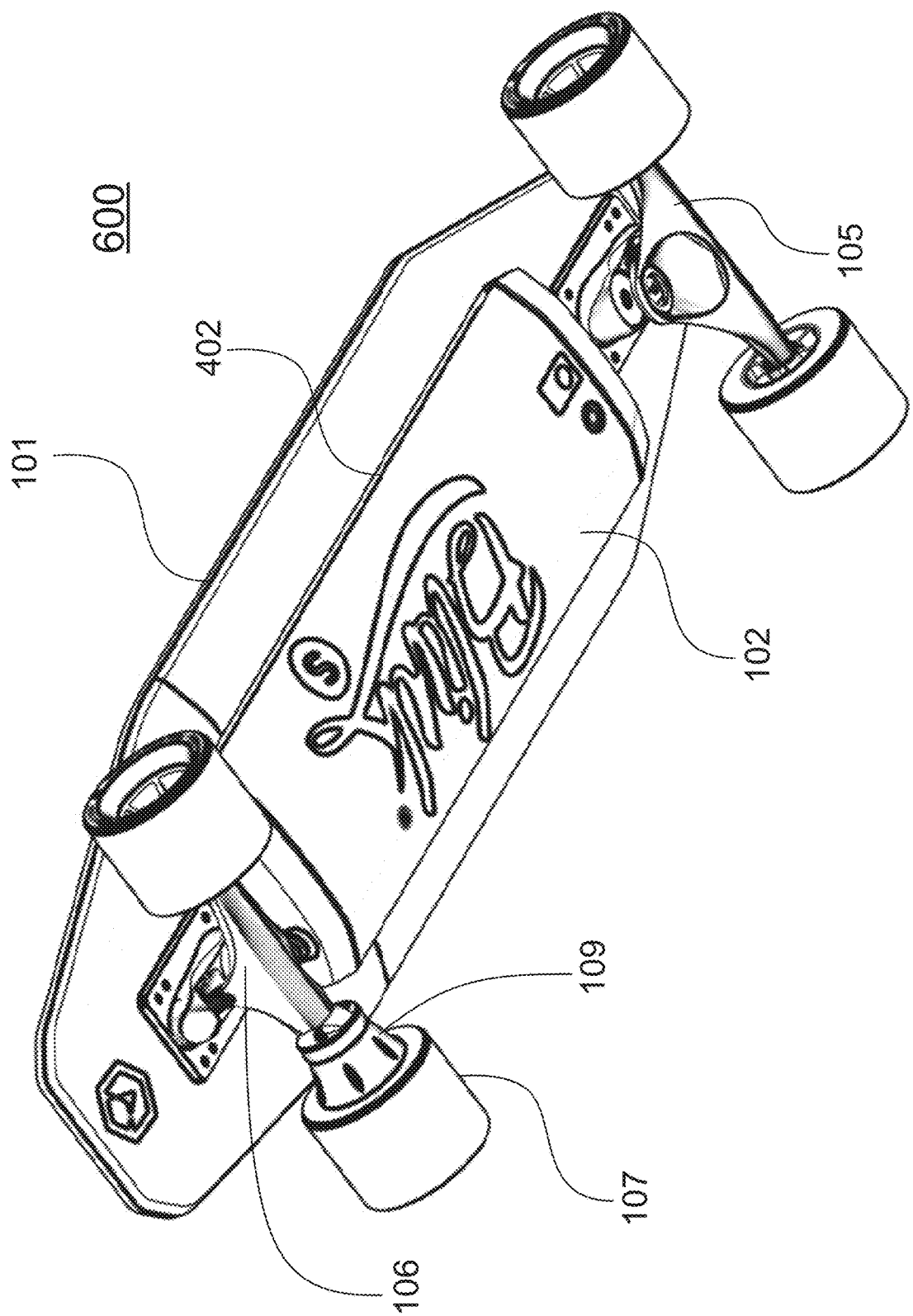
FIG. 6 shows a perspective view of the electric skateboard of FIG. 1.

FIG. 3A is a top view (300a) of the electric skateboard (100) with a sheet of grip tape (301) covering the top plate (115) to increase friction. In an embodiment, the front end (110) of the deck (101) is indicated by an arrow, while the rear end (111) of the deck (101) extends beyond the rear wheels. In other embodiments, the skateboard may include other structures, components, and/or shapes. FIG. 3B is a bottom view (300b) of the electric skateboard (100). In an embodiment, a switch (302) is installed in the baseplate (122) or other locations for turning on and off the electronics in the electric skateboard (100). A charging port (303) may be located in the baseplate (122) or in other locations in the battery case (102), for connecting the rechargeable battery (103) to an external power source for charging. FIGS. 4A and 4B are side views (400a and 400b) of the electric skateboard (100), in which the side lights 126 and 127 are visible, respectively. FIGS. 5A and 5B are front view (500a) and rear view (500b) of the electric skateboard (100), in which the front lights (124) and tail light (125) are visible, respectively. A perspective view (600) of the skateboard is demonstrated in FIG. 6.

The electric skateboard (100) may further include a remote controller that communicates wirelessly with the control module (104) to control the motor (109) and/or lights of the electric skateboard (100). Alternatively or additionally, a mobile application may be installed in a mobile device to allow the rider to control the electric skateboard (100). In one embodiment, the electric skateboard (100) include other structures and/or accessories.

Figure 7A:
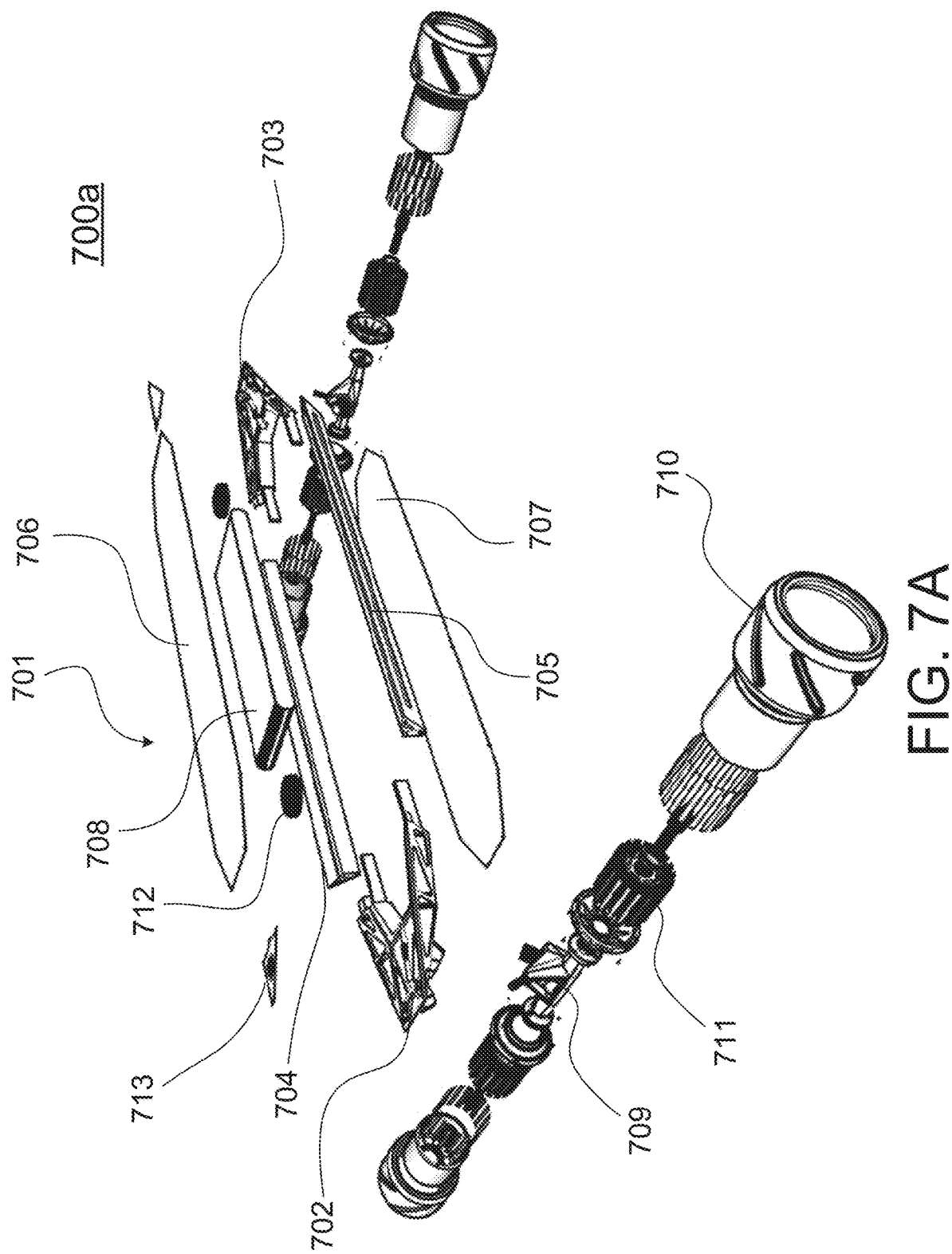
FIG. 7A show an exploded view of an alternative embodiment of an electric skateboard.

An alternative embodiment of an electric skateboard is demonstrated in FIGS. 7A-16C. Referring to FIG. 7A, disclosed is an electric skateboard (700a) that includes a frame assembly (701) (can also be called a deck) comprising a front end (702), a rear end (703), two side rails (704 and 705), a top plate (706), and a bottom plate (707). The frame assembly (701) forms an enclosure for housing at least a rechargeable battery pack (708) and electronics. The electric skateboard (700a) further includes a pair of trucks (709) mounted to the front end (702) and rear end (703), respectively. A plurality of wheels (710) are mounted on axles of the trucks (709). One or more motors (711) are installed in the wheels (710) for propelling the electric skateboard (700a). The motors (711) may be individually controlled. The electric skateboard (700a) may further include a plurality of lights mounted to the frame assembly (701) and/or the trucks (709). In some embodiments, the electric skateboard may include only one motor that can power two or more wheels. For example, two wheels may be coupled to a common shaft, which is coupled to the motor, and the motor can rotate the common shaft. Alternatively, each wheel is coupled to the motor, and the motor can rotate the wheel individually. The electric skateboard (700a) may also include one or more sound exciters (712) inside the frame assembly, which may be attached to different parts of the frame assembly (e.g., the top plate (706) or bottom plate (707) to maximize speaker performance). Another exploded view (700b) of the electric skateboard (700a) is demonstrated in FIG. 7B.

In an embodiment, the frame assembly (701) serves as a deck of the electric skateboard (700a). In an embodiment, the top plate (706) and bottom plate (707) are made of carbon fiber or other thin materials. In an embodiment, the front end (701), rear end (703), and/or two side rails (704 and 705) are made of aluminum, magnesium alloys, or other materials. In an embodiment, the side rails (704 and 705) are hollow and are connected to the front end (701) and rear end (703) by sliding onto extensions that extend from the front end (701) and rear end (703). In an embodiment, the side rails (704 and 705) may include slots into which the front end (701) and rear end (703) can be inserted. In other embodiments, the side rails (704 and 705) are connected to the front end (701) and rear end (703) via fasteners or other means. In another embodiment, the side rails (704 and 705) are integral to the frame assembly (701), i.e., the side rails (704 and 705) are formed with the frame assembly (701) as a one piece. In one embodiment, the frame assembly (701) forms an exoskeleton that uses carbon fiber sheets to create a ceiling and a floor to hold the battery pack (708) and electronics inside. In an embodiment, the frame assembly (701) is a monocoque, with all the parts being necessary to keep the whole assembly together. In an embodiment, the front end (701) and rear end (703) include channels through which electric wires go to connect motors to the electronics and/or battery pack (708). Optional cover plates (713) may be used to cover the channels. In one embodiment, the rechargeable battery pack (708) and electronics are mounted to the bottom plate (707) and/or the top plate (706).

In an embodiment, front end (702) and rear end (703) of the electric skateboard (700a) have a shape that resembles boomerangs, which provide several advantages over other construction types. Alternatively, the front end (702) and rear end (703) may have other shapes and/or structures. In an embodiment, the ends of the front end (702) and rear end (703) connect to aluminum extruded side rails (704 and 705) that run down the perimeter of the deck and complete an overall "frame" that can then be spanned with the top plate (706) and bottom plate (707) (e.g., made of carbon fiber sheets) to create a complete deck with a hollow center. This hollow center houses and protects the electronics and batteries inside. In an embodiment, the frame assembly (701) has an interior space that runs the length of the deck, since there is no "wood" or other ordinary deck of any kind. In an embodiment, the front end (702), rear end (703), and two side rails (704 and 705) are made of aluminum, or magnesium alloys, which can also serve as heatsinks. Alternatively, other materials may be used to make the parts of the frame assembly (701).

In an embodiment, the electric skateboard (700a) includes a plurality of lights (e.g., LEDs) that may be mounted to the frame assembly (701) and/or the trucks (709), providing illumination in some or all directions. In an embodiment, lights may be embedded in the frame assembly (701). In an embodiment, the side rails (704 and 705) may include slots into which the lights are inserted. The lights can be called side lights. In one embodiment, the side lights each may have an elongated shape. The side lights each may be a continuous elongated light. Alternatively, the side lights each may include multiple light bulbs covered by one continuous cover that makes the side light look like one continuous elongated light. In some other embodiments, the side rails or other parts of the skateboard, which are made of aluminum, or magnesium alloys, can be reinforced with carbon fiber or other materials, by mixing the carbon fiber or other materials in the aluminum, or magnesium alloys. In another embodiment, a separate piece of material, such as carbon fiber or other materials, can be added to the aluminum (or magnesium alloys)side rails to enforce the side rails. The separate piece can have a longitudinal shape, extending along the side of the skateboard to enforce the aluminum (or magnesium alloys) side rails.

In an embodiment, sound exciters (712) are attached to the carbon fiber sheet of the bottom plate (707) or top plate (706), serving as speakers. In an embodiment, the sound exciters (712) are housed inside the frame assembly (701) so that they are unaffected by weather and impact. In other embodiments, other types of speakers may be installed in the skateboard.

In an embodiment, a pair of trucks (709) are connected to the frame assembly (701), and a plurality of wheels (710) are mounted to axles of the trucks (709). In an embodiment, baseplates of the trucks (709) are integral to the front end (701) and rear end (703), respectively, so that there is no need for a separate mounting plate for either of the trucks (709). In an embodiment, each of the trucks (709) includes a bolt or screw for connecting the truck to the frame assembly (701). The trucks (709) may also include holes that receives bolts and/or bushings that protrude from the frame assembly (701). Other fasteners or other means of attachment may be used to connect trucks (709) to the deck in alternative embodiments. It should be appreciated that the exact number of fasteners, and their corresponding location may be varied according to design, and stress needs.

Figure 7B:
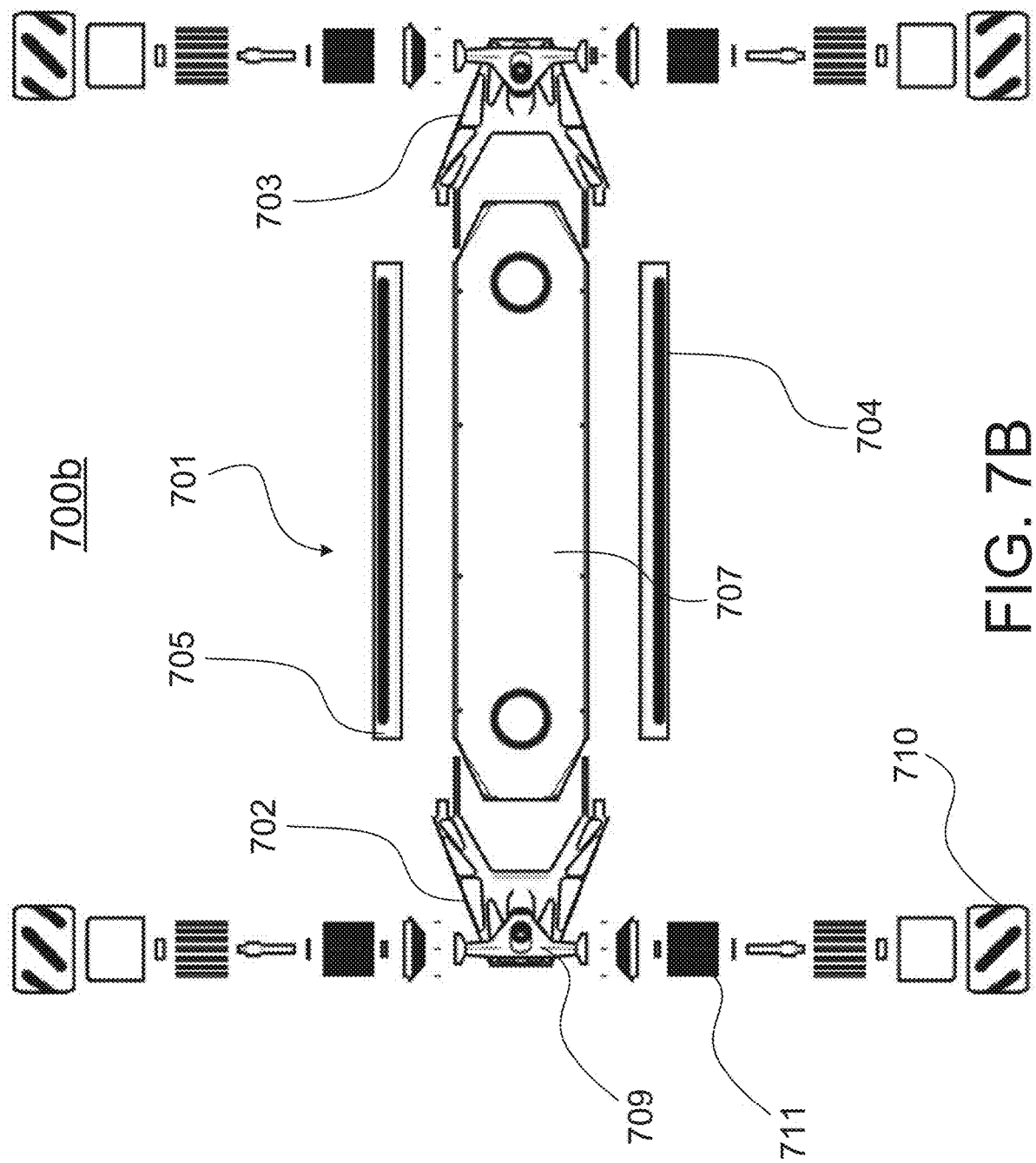
FIG. 7B show another exploded view of the electric skateboard of FIG. 7A.

As demonstrated in FIGS. 7A and 7B, the electric skateboard (700a) includes four motors (711), each installed in a wheel. In one embodiment, the trucks (709) include channels through which electric wires connect the motors (711) to the electronics and/or battery pack 708. The motors (711) may be any types of motors that are compatible with the dimensions of the wheels (710). In one embodiment, the motors (711) may be hub motors. The motors (711) may be individually controlled to propel the electric skateboard (700a) in either direction (e.g., forward and backward). The electric skateboard (700a) is an "all-wheel drive" skateboard, according to one embodiment. In other embodiments, some or all of the wheels (710) may be motorized.

Figure 8A:
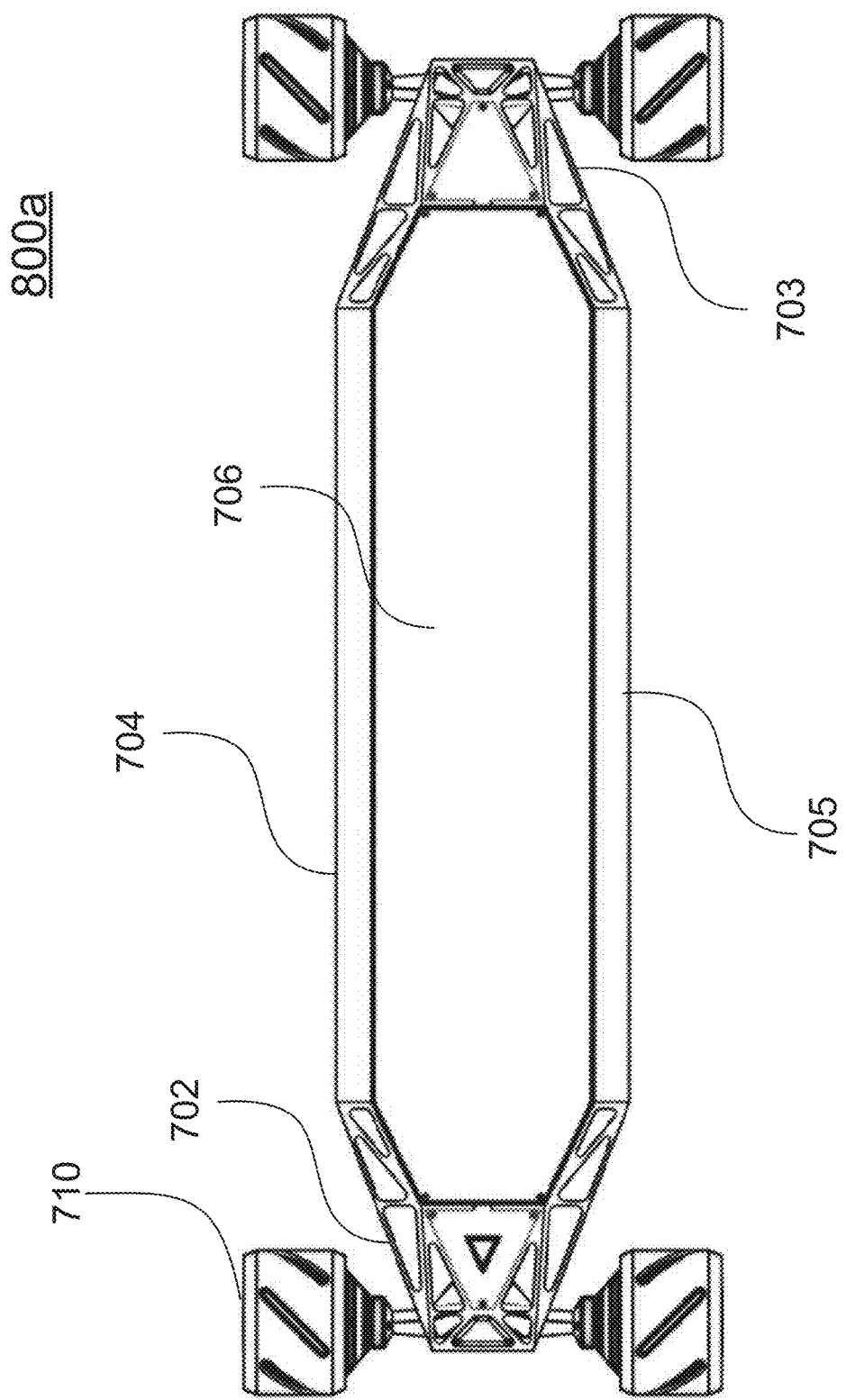
FIG. 8A shows a top view of the electric skateboard of FIG. 7A.
Figure 8B:
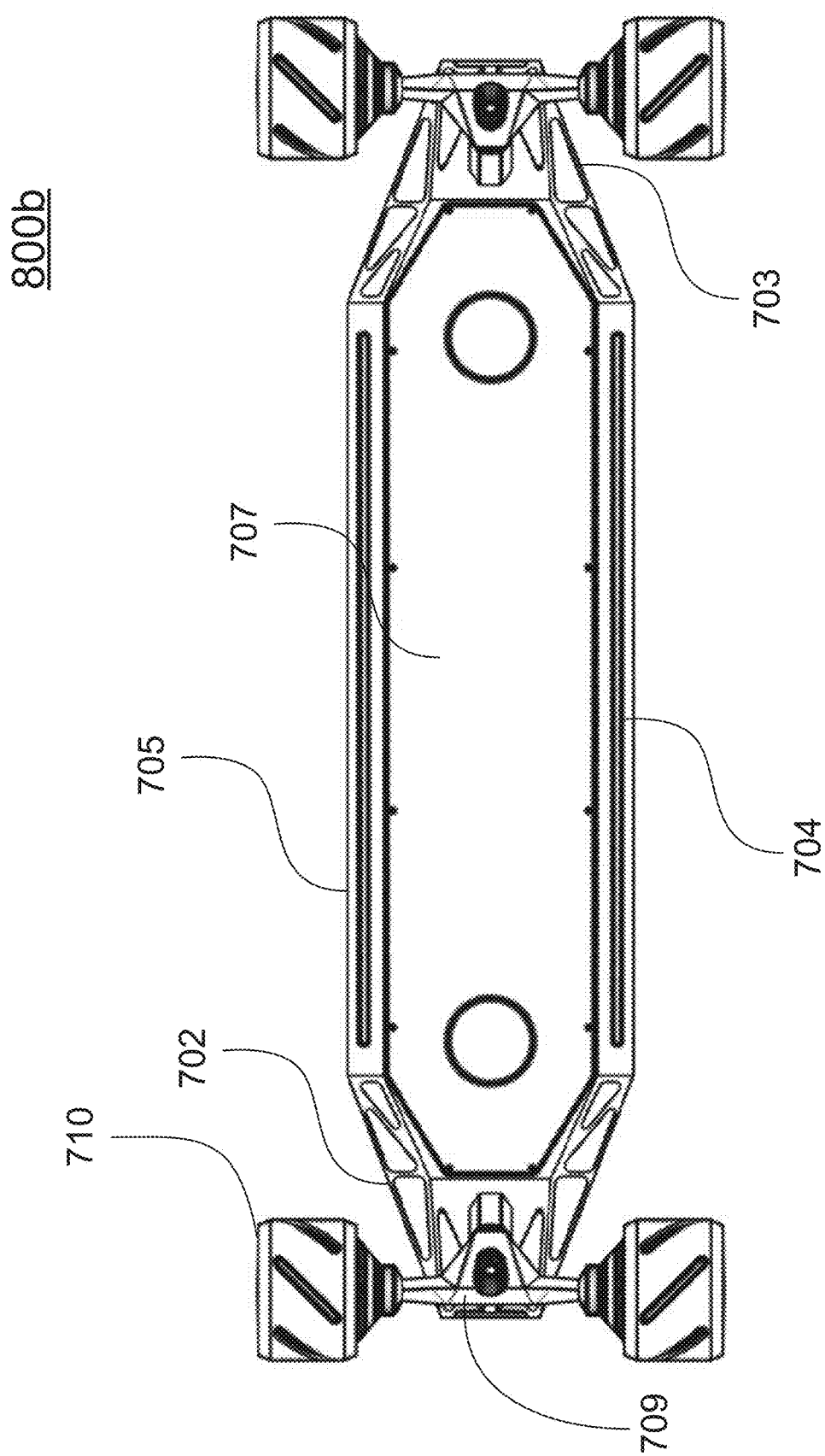
FIG. 8B shows a bottom view of the electric skateboard of FIG. 7A.
Figure 9:
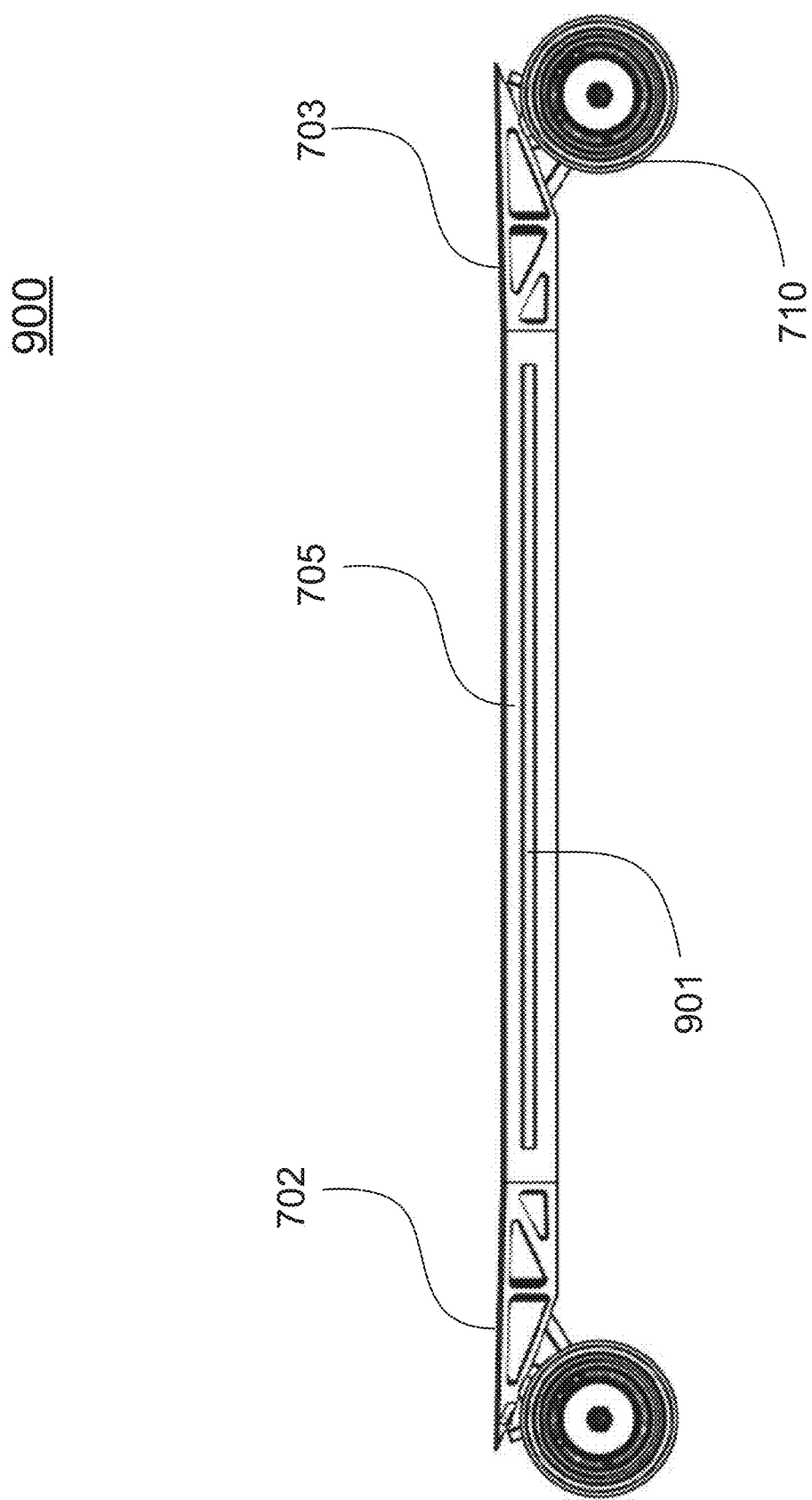
FIG. 9 shows a side view of the electric skateboard of FIG. 7A.
Figure 10:
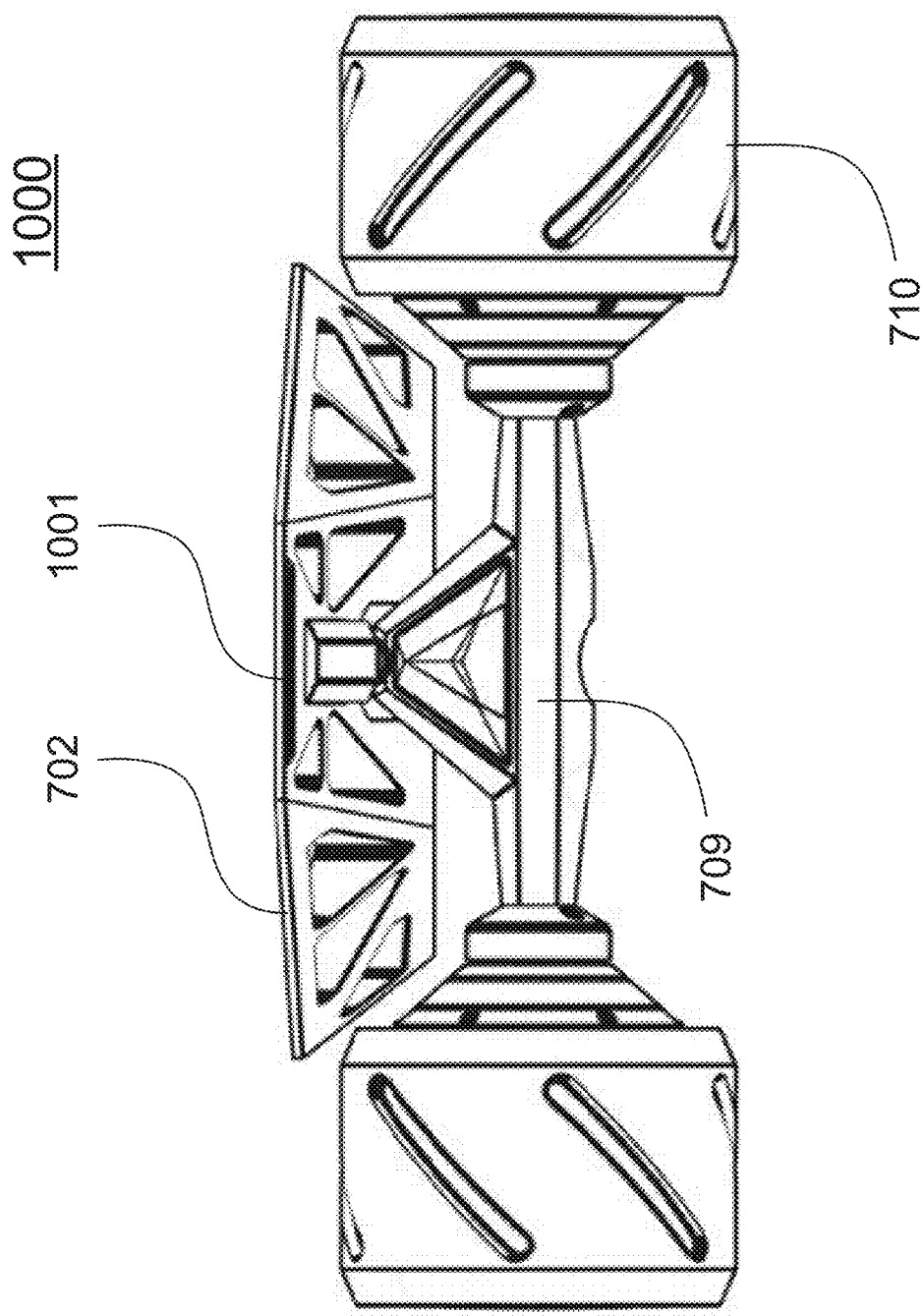
FIG. 10 shows a front view of the electric skateboard of FIG. 7A.
Figure 11:
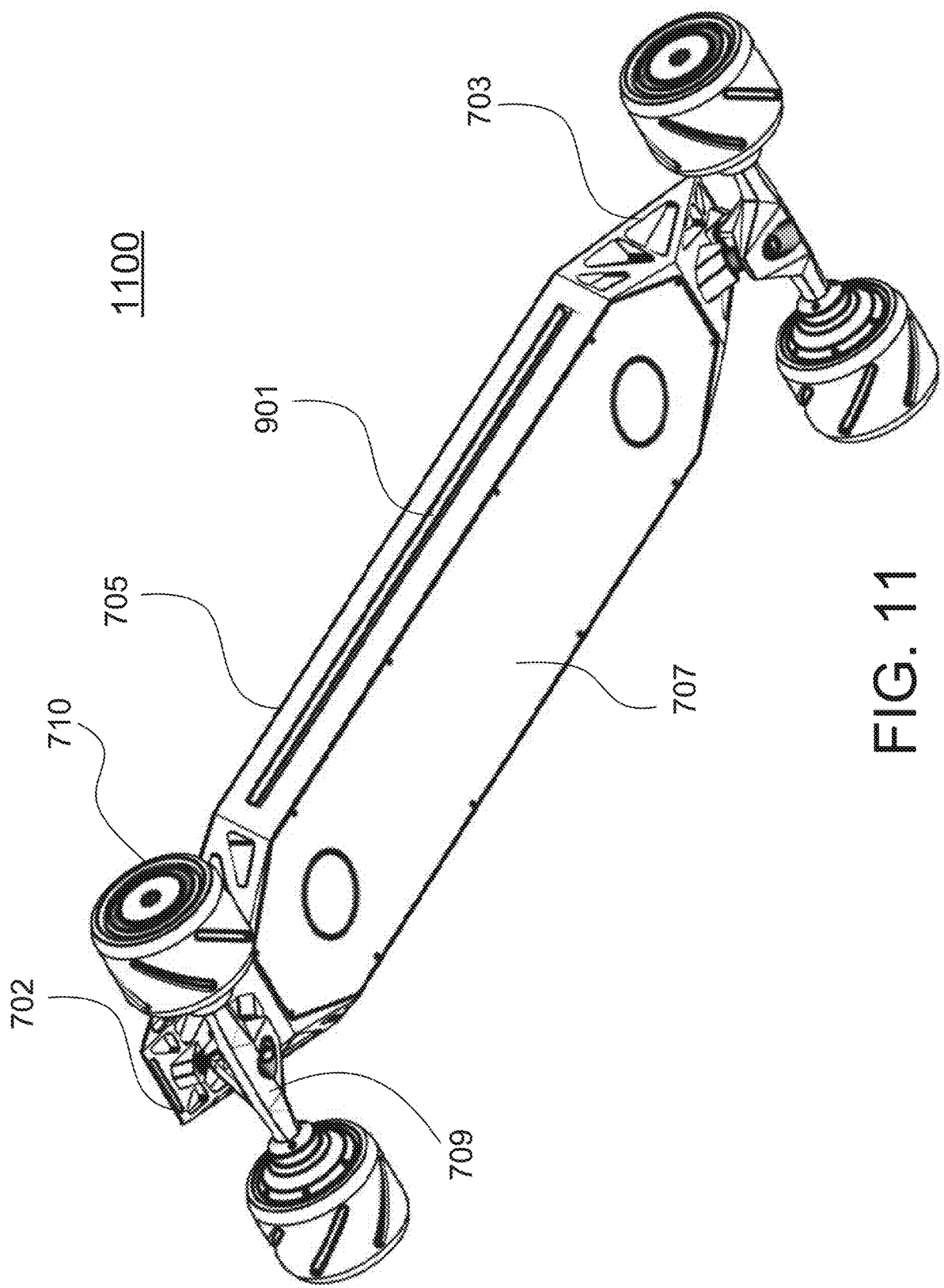
FIG. 11 shows a perspective view of the electric skateboard of FIG. 7A.

FIGS. 8A and 8B demonstrate a top view (800a) and a bottom view (800b) of the electric skateboard (700a), respectively. A side view (900) is shown in FIG. 9, with an optional side light (901) embedded or mounted in the side rail (705). In an embodiment, both sides of the electric skateboard (700a) have similar side views with side lights. In one embodiment, each side light may include a plurality of lights. In another embodiment, each side light may be one continuous piece, and include only one light. Each side light may extend approximately to the front and the rear end of the deck (701). The deck (701) has a length between the front end and the rear end, and, in one embodiment, the two elongated side lights each are more than half of the length of the deck. FIG. 10 is a front view (1000), with an optional head light (1001) embedded or mounted in the front end (702). Alternatively or additionally, a head light may be embedded or installed in the truck (709). In an embodiment, a rear view of the electric skateboard (700a) may look similar to the front view (1000), with a rear light embedded or installed in the rear end (703) or the truck. A perspective view (1100) of the electric skateboard (700a) is demonstrated in FIG. 11.

Figure 12A:
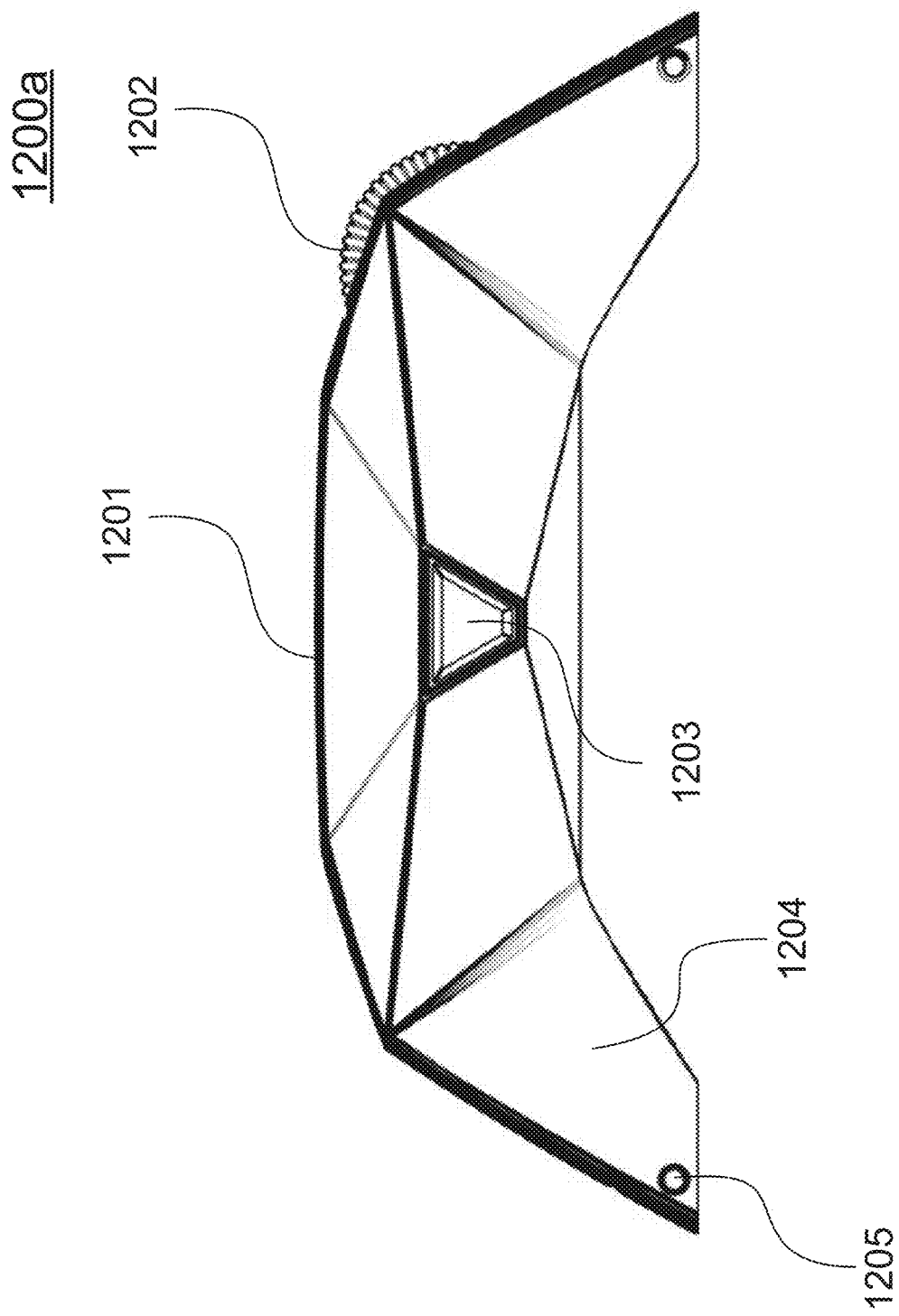
FIG. 12A shows a top view of a remote controller in a folded state, according to one exemplary embodiment.

The electric skateboard may include a handle which includes a remote controller. Embodiments of a remote controller (1200a) are demonstrated in FIGS. 12A-15C. In one embodiment, the remote controller is used to control the electric skateboard (700a) and/or to carry or pull the electric skateboard (700*a*). Referring to FIG. 12A, the remote controller (1200*a*) includes a body (1201) that has a curved top edge and two wings (1204) extending away from the top edge, configured to be gripped by a rider's hand. In one embodiment, the body (1201) may be assembled by connecting a top piece to a bottom piece. In one embodiment, a scroll wheel (1202), or other types of controlling means, is installed at one end of the top edge, configured to be manipulated by the rider's finger(s) to control the movement of the skateboard. Alternatively or additionally, the remote controller (1200*a*) may include other controlling means such as, but not limited to, buttons, a scroll ball, a touch pad(s), etc. The remote controller (1200*a*) may also include one or more buttons (1203) located on either side of the body (1201), which may be pressed to release two spring-loaded arms (1206) (FIG. 12B) that are pivotally connected (e.g., via pivots (1205)) to either of the wings (1204). In an embodiment, a single button on one side of the remote controller (1200*a*) is used to release the arms (1206).

Figure 12B:
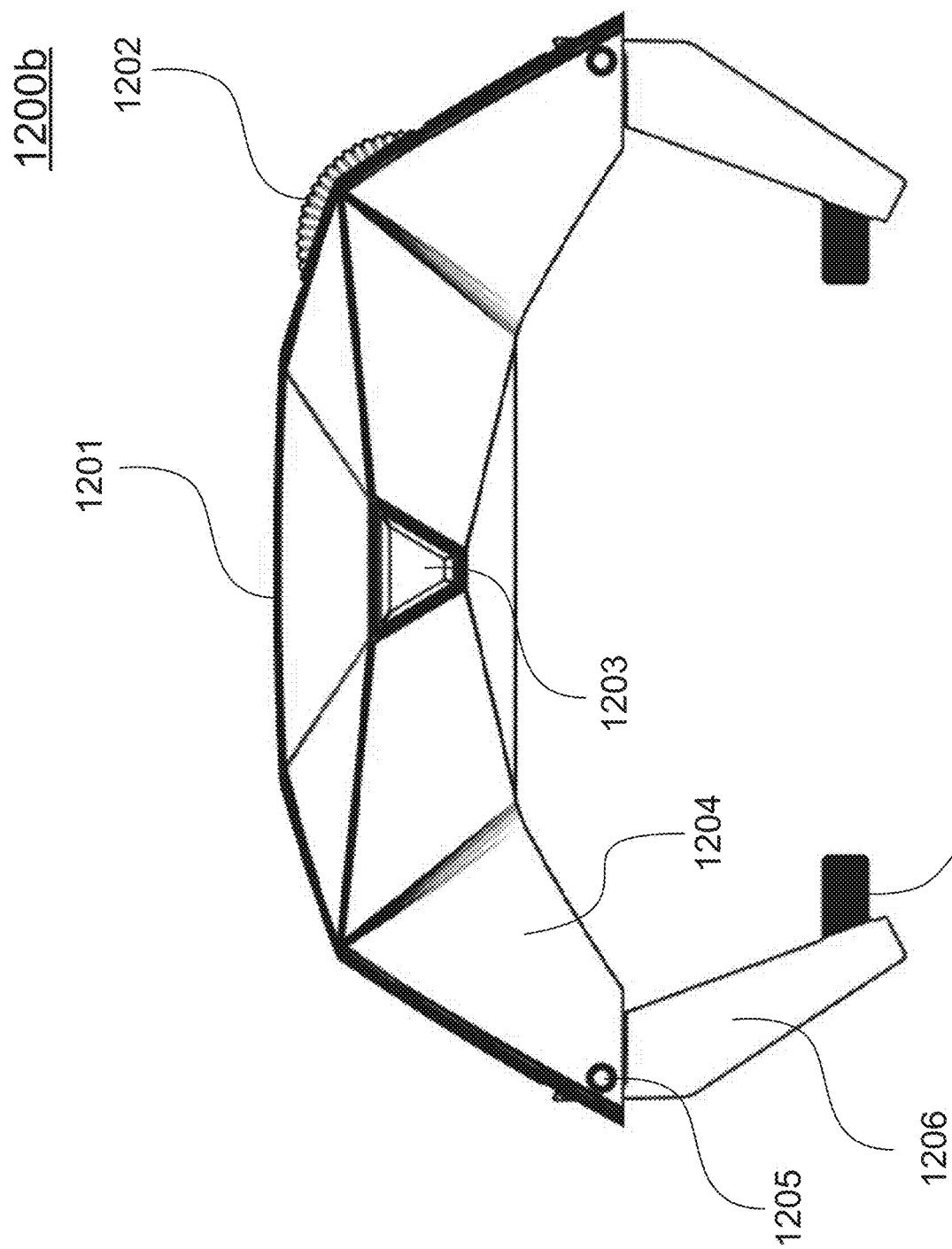
FIG. 12B shows another top view of the remote controller in a deployed state.
Figure 12C:
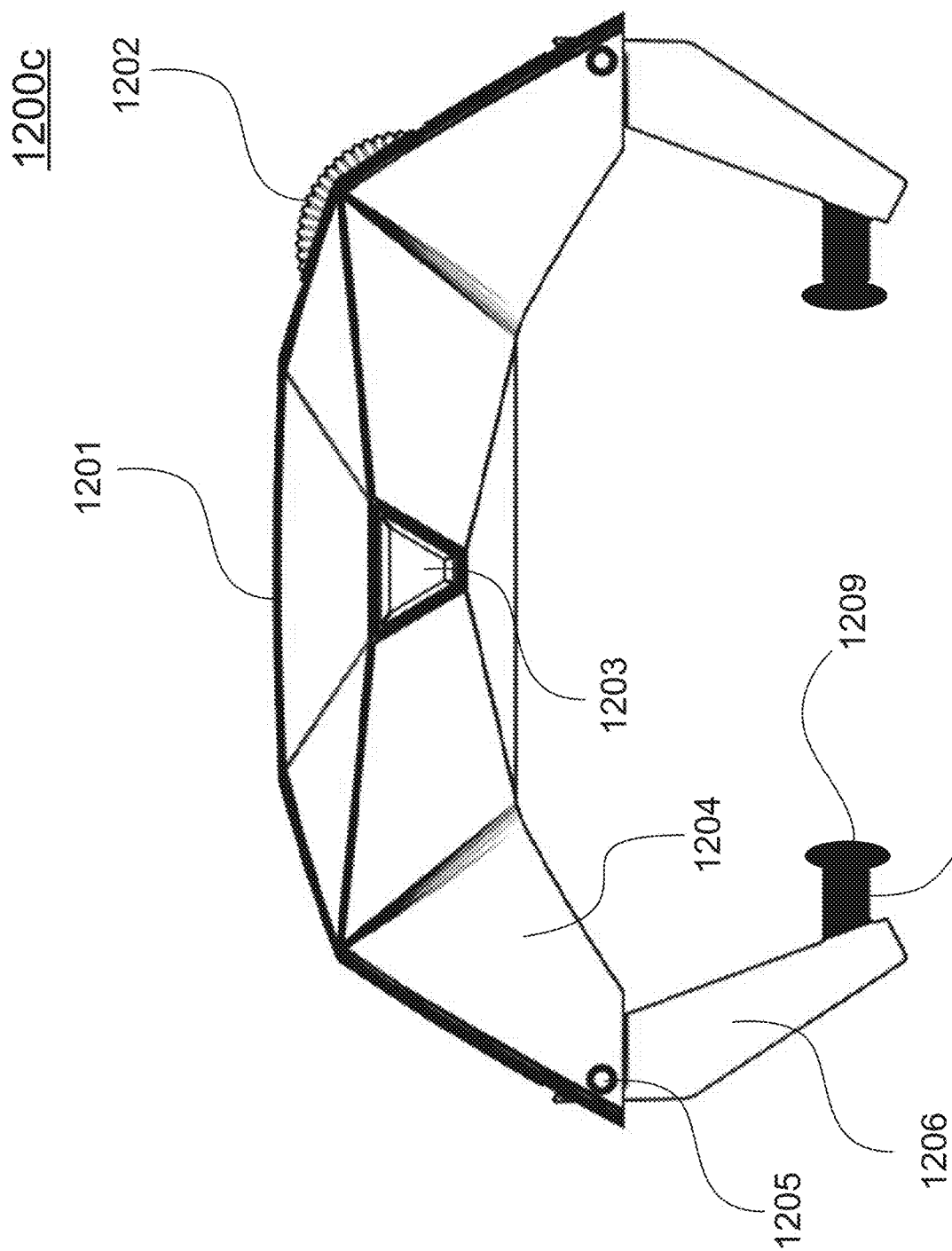
FIG. 12C shows a top view of an alternative embodiment of a remote controller in a deployed state.

FIG. 12B demonstrates a view (1200*b*) of the remote controller (1200*a*) with the arms (1206) deployed, which can be connectable, i.e., removably connected, to the electric skateboard (700*a*) to be used as a handle. In an embodiment, the arms (1206) include protrusions (1207) that are located at the ends away from the body (1201). The protrusions (1207), facing each other, can slide into grooves in the skateboard for carrying and/or pulling the skateboard. In an embodiment, the arms (1206) are spring based and, when deployed, can only open to a maximum angle of a certain degree from the wings (1204). When folded, the arms (1206) can stay inside slots in the wings (1204), so that the remote controller (1200*a*) can be held in the rider's hand. An alternative embodiment of the remote controller is demonstrated in FIG. 12C. Each of the protrusions (1208) in FIG. 12C includes a head (1209) at the end, which has a bigger diameter than that of the protrusions (1208). In an embodiment, each head (1209) slides into a groove in the skateboard, which has a wider entrance and narrows at the surface along the groove. The head (1209) stops the protrusion (1208) from sliding off, and thus enhance the stability when used as a handle to carry the skateboard. In some embodiments, the head (1209) may have different shapes and/or sizes that match the grooves in the skateboard. In another embodiment, the remote controller (1200*a*) may include hooks or other structures for removably connecting the remote controller (1200*a*) to the skateboard.

Figure 12D:
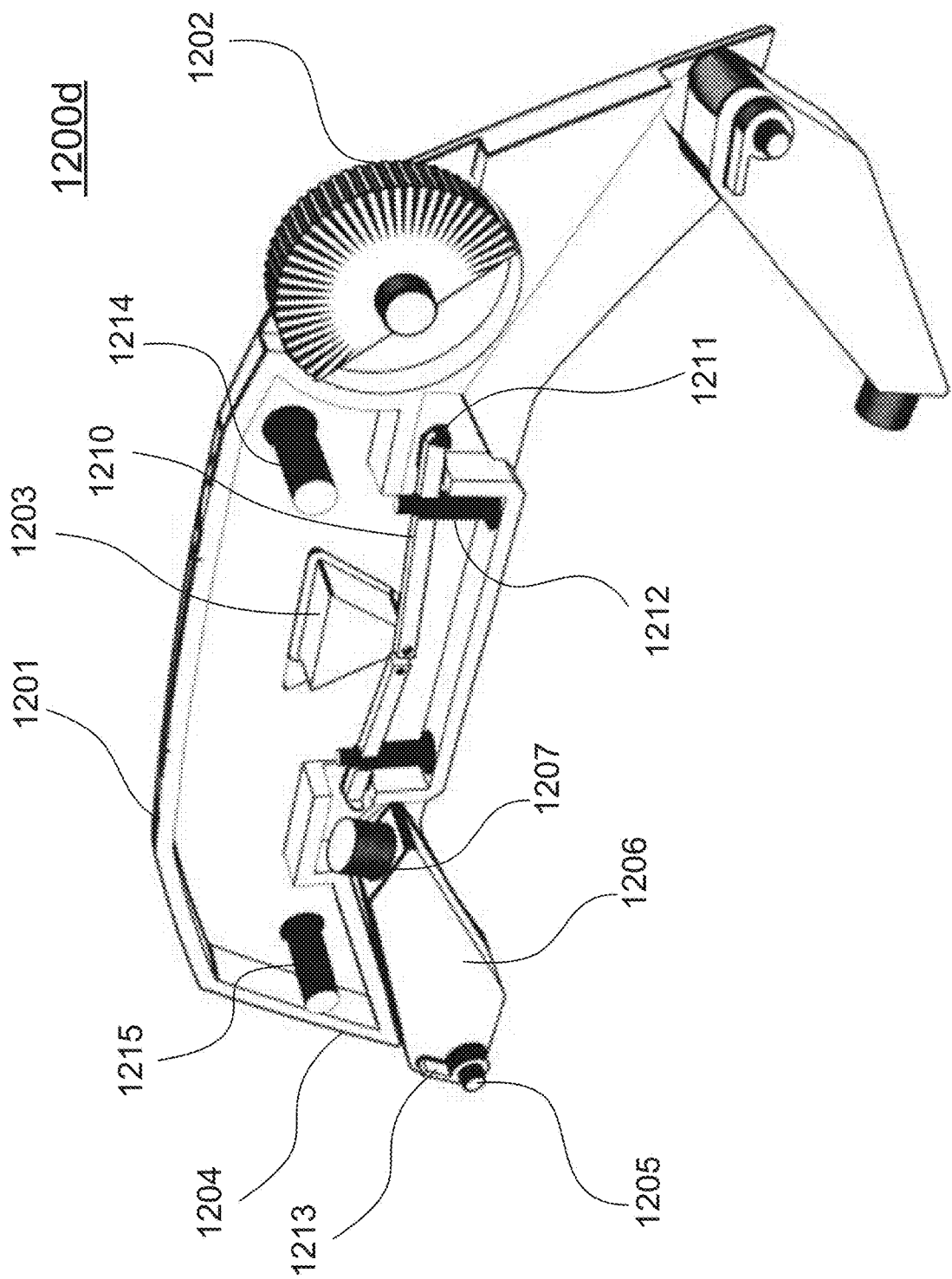
FIG. 12D shows a view of inner structures of a remote controller.

FIG. 12D shows a view (1200*d*) of the inner structures of the remote controller (1200*a*). In one embodiment, a pair of levers (1210) are pivoted at protrusions (1212) that serve as fulcrum. The arms (1206) are biased by springs (1213) to stay open. Each of the levers (1210) has one end adjacent to the button (1203) and another end having a wedge (1211) that holds the arm (1206) in the folded state by preventing the protrusion (1207) from sliding off. When the button (1203) is pressed down by the rider, the ends of the levers (1210) are pushed away by the button (1203). As a result, the wedges (1211) move away from the protrusions (1207)), releasing the arms (1206) to the deployed state. Although FIG. 12D shows one arm folded while the other arm open, it is for illustration purpose and it should be understood that both arms (1206) can be deployed simultaneously. Two screws (1214 and 1215) or bolts may be used to connect the two pieces of the body (1201). In other embodiments, the two pieces of the body (1201) may be connected via other means. In alternative embodiments, the remote controller (1200*a*) may include other structures and/or other means to hold and release the arms (1206).

Figure 13B:
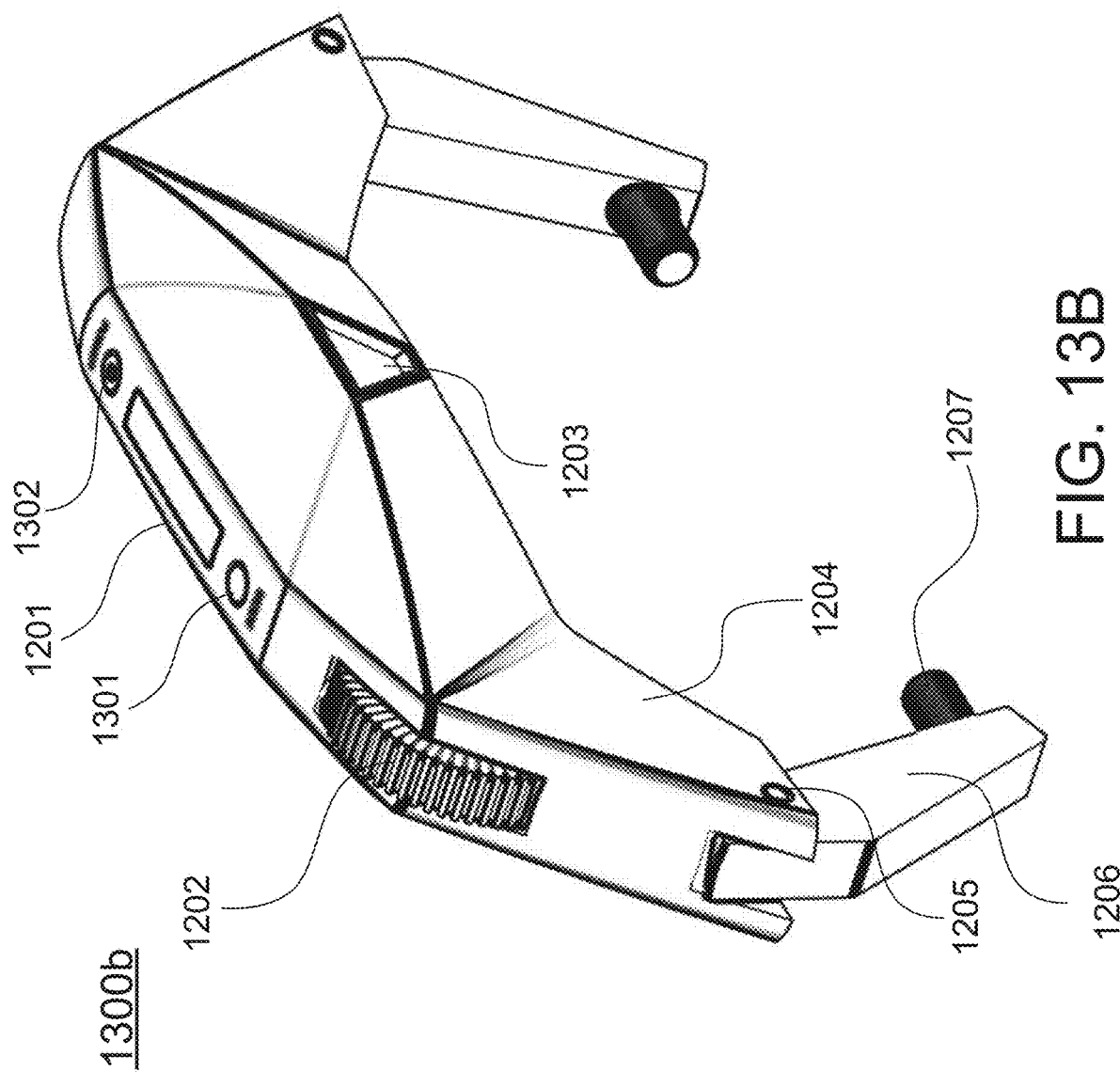
FIG. 13B shows another perspective view of the remote controller in the deployed state.
Figure 14B:
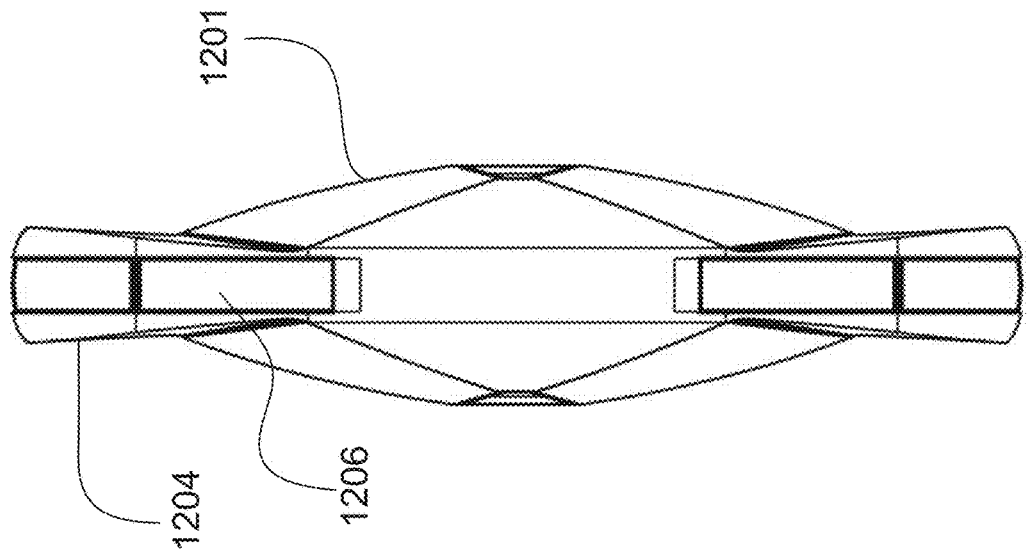
FIG. 14B shows a rear view of the remote controller in the folded state.
Figure 14A:
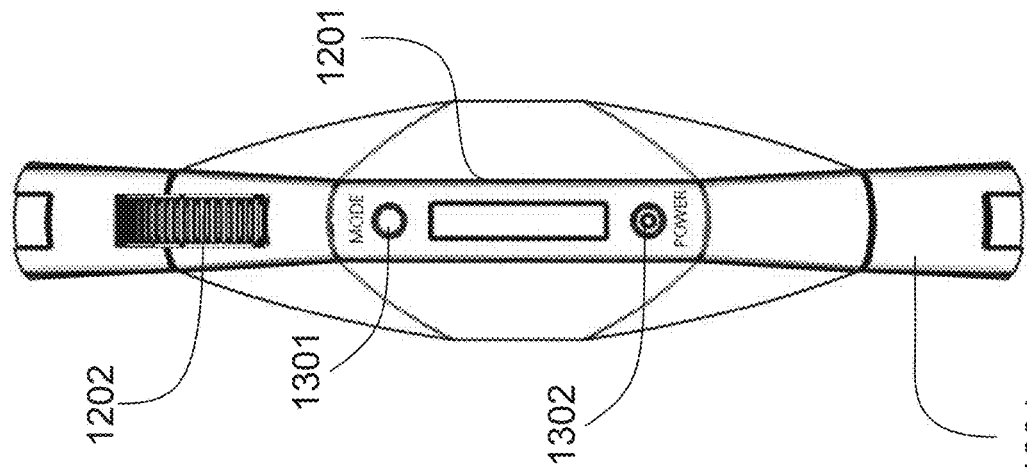
FIG. 14A shows a front view of the remote controller.

As demonstrated in FIGS. 13A and 13B, the remote controller (1200*a*) may include a plurality of buttons (e.g., buttons 1301 and 1302) or touch pads for controlling the on-and-off and the modes of the remote controller (1200*a*). A top view (1400*a*) and a bottom view (1400*b*) of the remote controller are shown in FIGS. 14A and 14B.

Figure 15A:
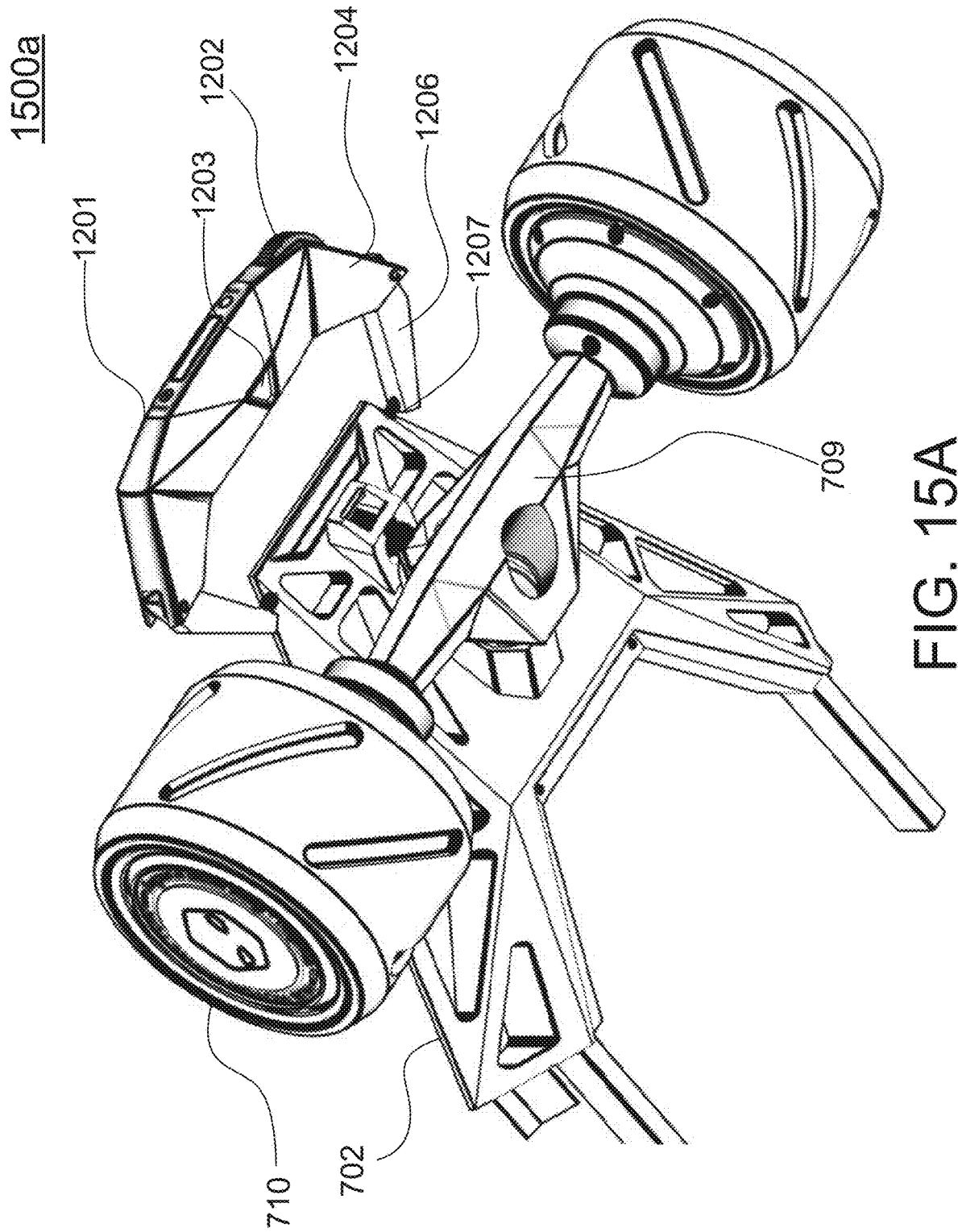
FIG. 15A shows a perspective view of the remote controller connected to the front end of the electric skateboard of FIG. 7A.
Figure 15B:
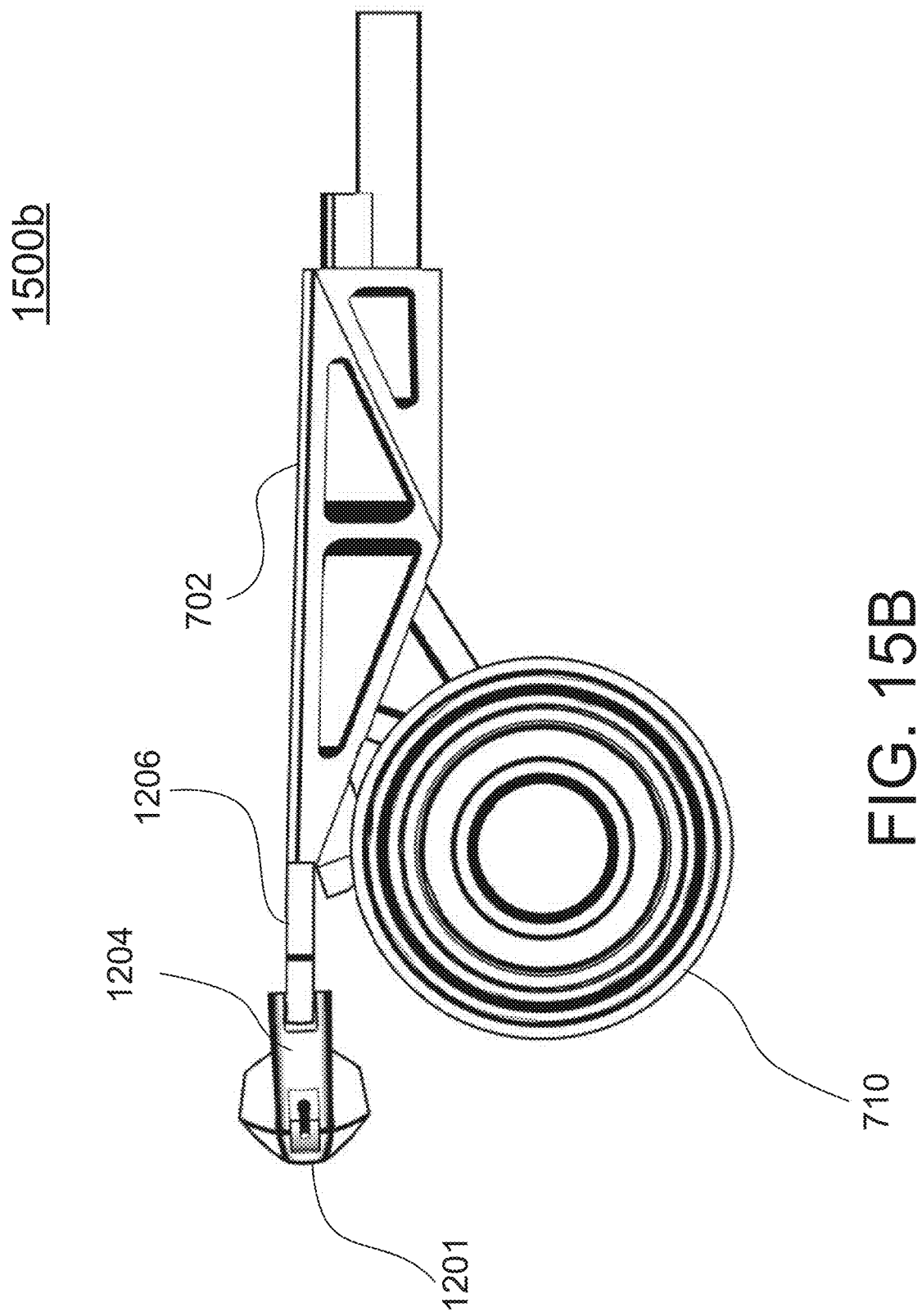
FIG. 15B shows a side view of the remote controller connected to the front end.
Figure 15C:
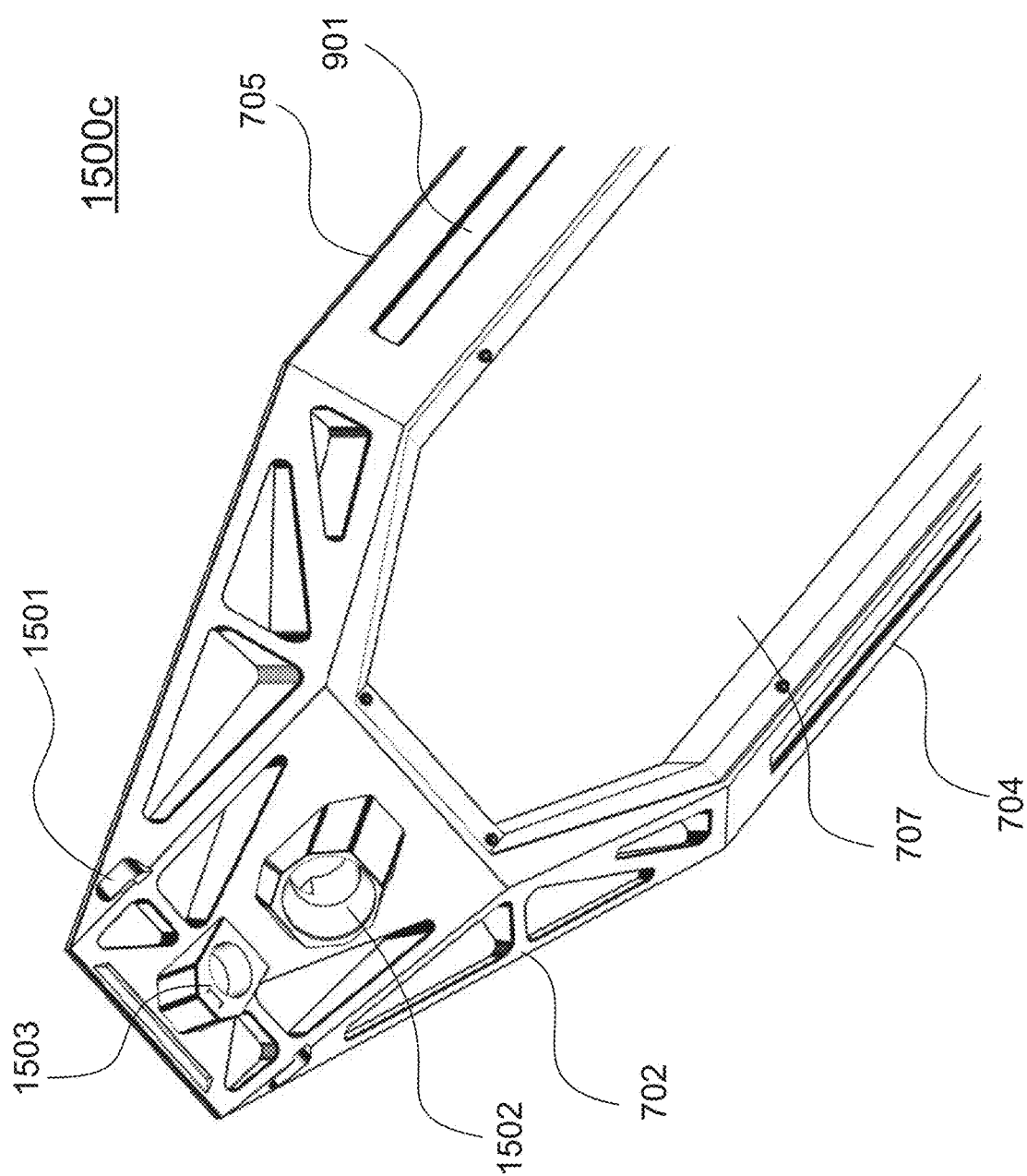
FIGS. 15C and 15D show perspective views of the front end with grooves for receiving the remote controller.
Figure 15D:
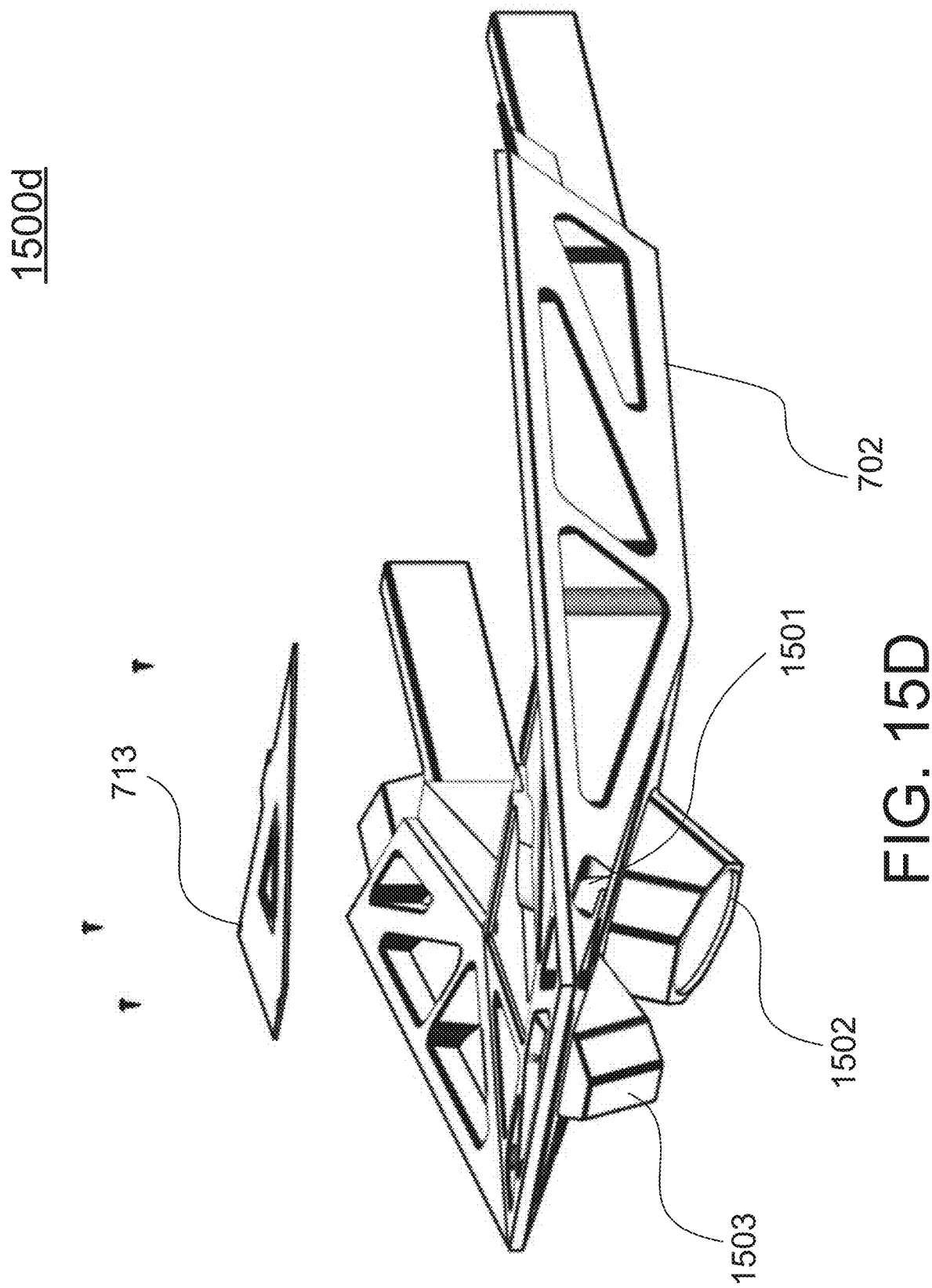

As demonstrated in FIGS. 15A-D, when the arms (1206) are deployed, the protrusions (1207) may slide along two grooves (1501) located on either side of the front end (702) of the deck and approximately parallel to the deck. FIGS. 15C and 15D show different views (1500*c* and 1500*d*) of the grooves (1501) in the front end (702). The groove on either side may have an entrance at the back, leading toward an indentation at the front of the groove. In alternative embodiments, the grooves may have other shapes, sizes, and/or structures. In one embodiment, the relative terms of "front" and "back" correspond to the orientation of the skateboard (e.g., the front end and rear end indicate the front and back, respectively). The protrusions (1207 or 1208) may slide into the entrances of the grooves (1501) toward the front ends until stopped in the indentations, allowing the rider to pull and/or carry the skateboard. To remove the remote controller (1200*a*), the protrusions (1207 or 1208) of the remote controller can slide backwards and out of the grooves (1501). Alternatively, the remote controller (1200*a*) may be removably connected to the rear end (703) that may include grooves. In an embodiment, the grooves (1501) may have a wider entrance, and narrows at the surface, allowing the head (1209) of the protrusion (1208) to slide in. As further demonstrated in FIGS. 15C and 15D, the front end (702) (as well as rear end (703)) includes protrusions (1502 and 1503) with holes that receive bolts and/or bushings for mounting the truck to the frame assembly.

Figure 16A:
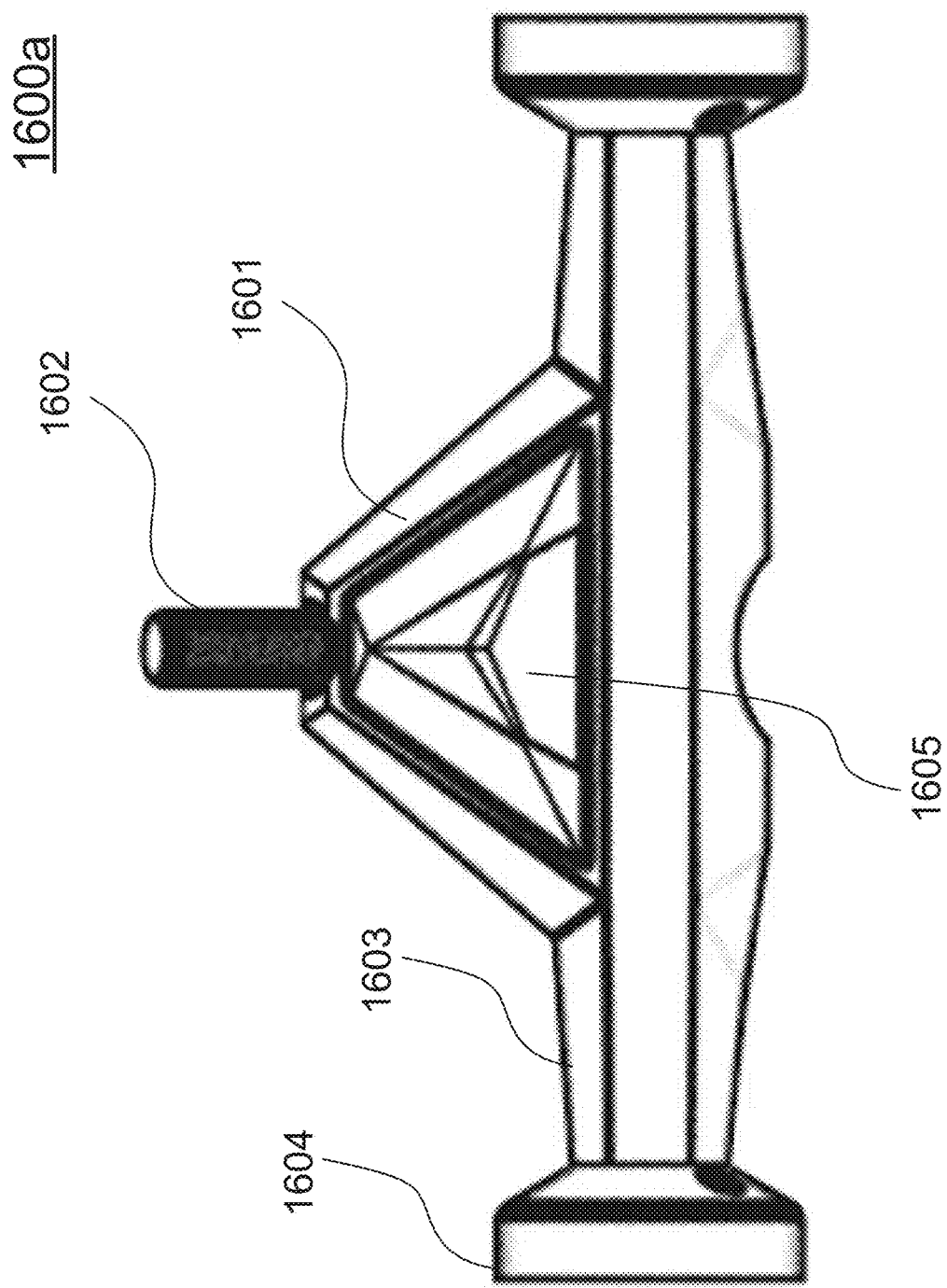
FIGS. 16A-C show different views of the truck of FIG. 7A.
Figure 16B:
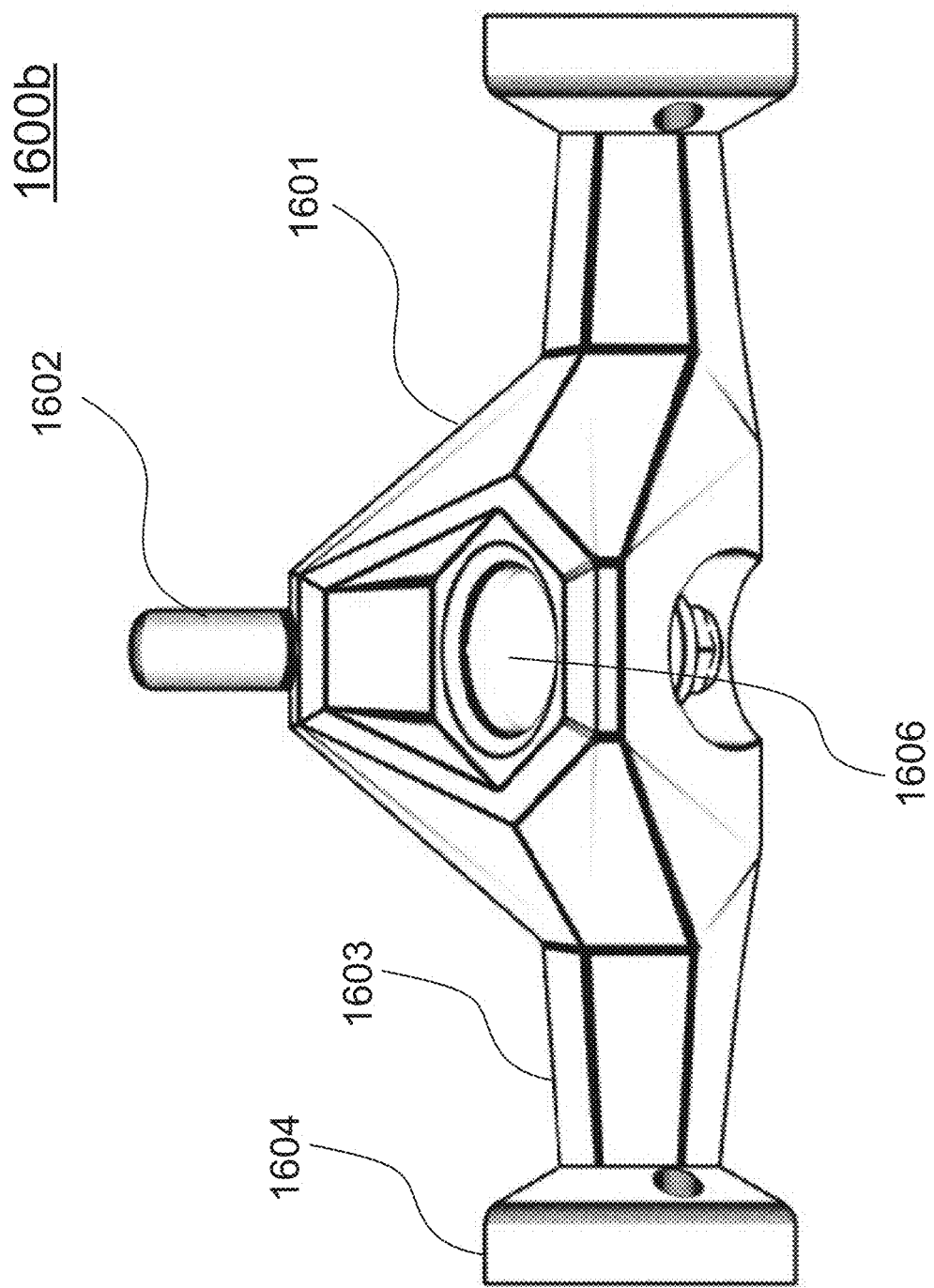
Figure 16C:
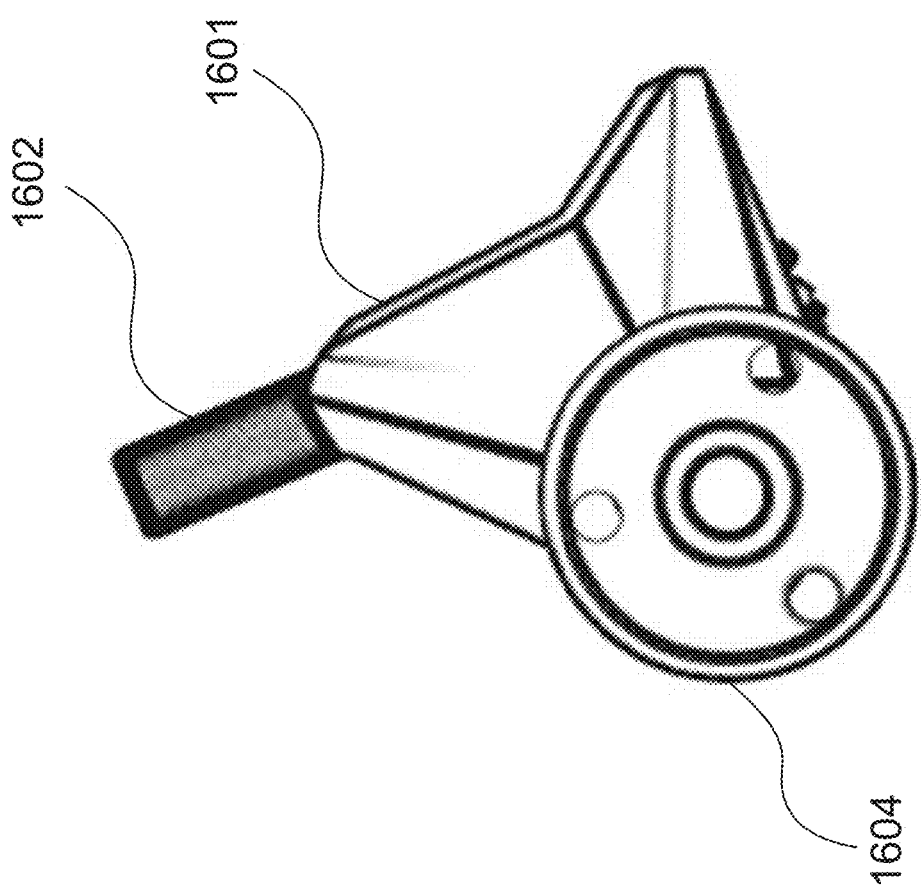

FIGS. 16A-C demonstrate different views of an embodiment of the truck (709). In an embodiment, the truck includes a body (1601) from which a bolt (1602) or screw extends to be inserted in the hole (1503) in the front end (702). The body (1601) is connected to an axle (1603) and two connectors (1604) are connected to the ends of the axle (1603). Motorized wheels may be mounted to the connectors (1604). FIG. 16A further shows a triangular piece (1605) that may include a light or can reflect light. As shown in FIG. 16B, the body (1601) may include a hole (1606) that receives a bolt for connecting the truck to the frame assembly. In an embodiment, a bushing may be fitted onto the bolt to provide cushion, serving as a shock absorber. In other embodiments, other means may be used to connect the truck to the frame assembly.

In an embodiment, provided is a method of making the presently disclosed electric skateboard (100). The method may include forming the components of the electric skateboard (100), installing or inserting the head lights and tail light in the front end (118) and rear end (119), sliding the side lights into the slots of the two sides (120 and 121), assembling the battery case (102) by inserting the front end (118) and rear end (119) to the slots in the base plate (122), mounting the battery case (102) to the bottom side (113) of the deck (101), installing the motor (109) in a wheel and mounting wheels (107) to the trucks (105), connecting the trucks (105) to the bottom side (113) of the deck (101), placing the rechargeable battery pack (103), control module (104) and other electronics inside the opening (114) and the battery case (102), connecting the electric wires, covering the opening (114) with the cover plate (115), and seal the opening (116) with the plastic cover (117). In at least one embodiment, the method disclosed herein may not require all of the steps or may include other steps, and the steps disclosed herein may be performed in other orders.

In an embodiment, provided is a method of making the presently disclosed electric skateboard (700a). The method may include forming the components of the electric skateboard (700a), installing or inserting lights in the components of the frame assembly, attaching sound exciters (712) to the bottom plate (707) or top plate (706), mounting the rechargeable battery pack (708), a control module, and/or communications module to the bottom plate (707), sliding the bottom plate (707) and top plate (706) in the slots of the side rails (704 and 705), inserting the front end (702) and rear end (703) into the slots in the side rails (704 and 705), installing the motor (711) in each wheel (710) and mounting the wheels (710) to the trucks (709), and connecting the trucks (709) to the front end (702) and rear end (703).

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An electric skateboard, comprising:
   a deck including a front end and a rear end, wherein the front end includes a front channel and the rear end includes a rear channel, the deck including a plurality of side rails connected to the front and rear ends, a top plate and a bottom plate that span the side rails, the deck including first and second side lights;
   a rechargeable battery pack enclosed in an enclosure attached to the deck, the enclosure including first and second sides each including a slot for mounting the first and second side lights;
   a front truck mounted on the front end and a rear truck mounted on rear end of the deck;
   a pair of front wheels mounted on the front truck and a pair of rear wheels mounted on the rear truck;
   at least one front hub motor used to power the pair of front wheels, wherein the at least one front hub motor is electrically connected to the rechargeable battery pack through the front channel; and
   at least one rear hub motor used to power the pair of rear wheels, wherein the at least one rear hub motor is electrically connected to the rechargeable battery pack through the rear channel, the at least one front hub motor and the at least one rear huh motor being individually controlled to rotate in same directions and propel the electric skateboard forward and backward.

2. The electric skateboard of claim 1, further comprising a handle including a remote controller for controlling the hub motors, wherein the handle includes two foldable arms that are connectable to the deck for carrying the electric skateboard.

3. The electric skateboard of claim 2, wherein the foldable arms each include a protrusion configured to slide into a groove in the deck for carrying the skateboard.

4. The electric skateboard of claim 1, further comprising one or more elongated side lights mounted to two sides of the deck and each extending approximately to the front and the rear end.

5. The electric skateboard of claim 4, wherein the deck has a length between the front end and the rear end, and the two elongated side lights each are more than half of the length of the deck.

6. The electric skateboard of claim 1, wherein the deck includes carbon fiber material.

7. The electric skateboard of claim 1, further comprising one or more sound exciters attached to the deck.

8. The electric skateboard of claim 1, wherein the side rails and the plates form a hollow center that houses and protects the rechargeable battery pack.

* * * * *